United States Patent
Huggenberger et al.

(10) Patent No.: US 10,252,357 B2
(45) Date of Patent: Apr. 9, 2019

(54) WIRE MANAGEMENT SYSTEM

(71) Applicant: MEYER BURGER AG, Gwatt (Thun) (CH)

(72) Inventors: Stefan Huggenberger, Riniken (CH); Christoph Heiniger, Muenchenbuchsee (CH)

(73) Assignee: MEYER BURGER AG, Gwatt (Thun) (CH)

( * ) Notice: Subject to any disclaimer, the term of this patent is extended or adjusted under 35 U.S.C. 154(b) by 461 days.

(21) Appl. No.: 14/443,985

(22) PCT Filed: Dec. 4, 2013

(86) PCT No.: PCT/IB2013/060620
§ 371 (c)(1),
(2) Date: Jun. 3, 2015

(87) PCT Pub. No.: WO2014/087340
PCT Pub. Date: Jun. 12, 2014

(65) Prior Publication Data
US 2015/0298228 A1    Oct. 22, 2015

(30) Foreign Application Priority Data
Dec. 4, 2012 (EP) .................................. 12195539

(51) Int. Cl.
*B23D 57/00* (2006.01)
*B28D 5/04* (2006.01)
*B23D 61/18* (2006.01)

(52) U.S. Cl.
CPC ..... *B23D 57/0007* (2013.01); *B23D 57/0053* (2013.01); *B23D 57/0061* (2013.01); *B23D 61/185* (2013.01); *B28D 5/045* (2013.01)

(58) Field of Classification Search
CPC ............ B23D 57/0007; B23D 57/0053; B23D 57/0061; B23D 61/18; B23D 61/185; B28D 5/045
(Continued)

(56) References Cited

U.S. PATENT DOCUMENTS 4,484,502 A    11/1984   Ebner
4,655,191 A    4/1987    Wells et al.
(Continued)

FOREIGN PATENT DOCUMENTS

CH    691202 A5    5/2001
CH    691292 A5    6/2001
(Continued)

OTHER PUBLICATIONS

EPO search report and written opinion from priority EPO application EP12195539, dated Apr. 18, 2013, in English.
(Continued)

*Primary Examiner* — Eileen P Morgan
(74) *Attorney, Agent, or Firm* — Nadya Reingand; Yan Hunkin

(57) ABSTRACT

The invention relates to a wire management system (7) for a wire saw (8) having a cutting wire (3) which is guided through a cutting area (13), the wire management system (7) comprising a wire supplying unit (5) for supplying cutting wire (3) to the cutting area (13) of the wire saw (8) and a wire receiving unit (6) for receiving cutting wire (3) from the cutting area (13) of the wire saw (8), wherein at least one of the wire supplying unit (5) and the wire receiving unit (6) comprises: at least one rotatable reservoir spool (1) for carrying the cutting wire (3) in overlapping windings, at least one rotatable storage spool (2) for temporarily receiving the cutting wire (3) in windings, wherein the rotational axis (2b) of the storage spool (2) coincides with the rota-
(Continued)

Figure 1:
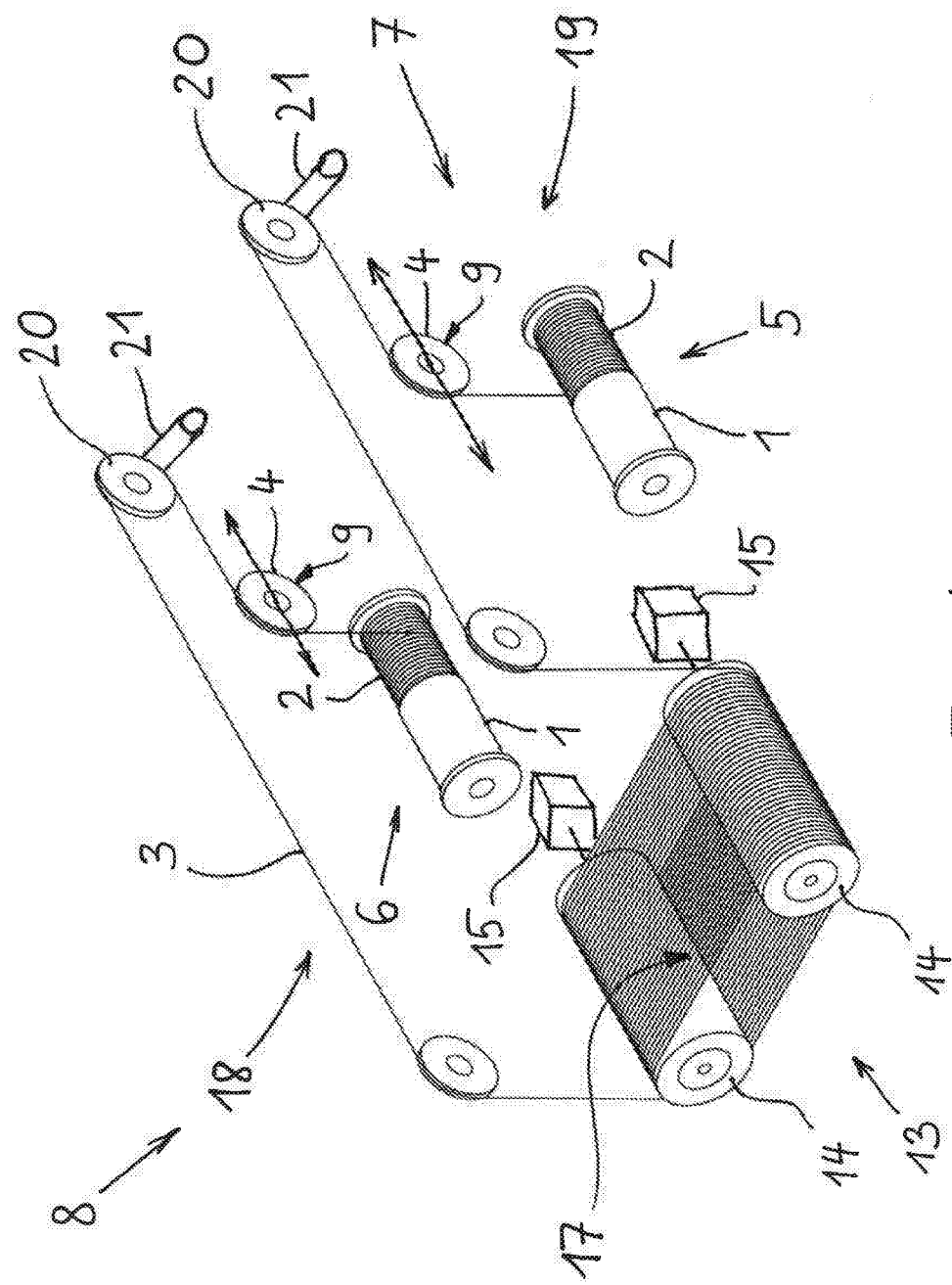

tional axis (1 *b*) of the reservoir spool (1), a wire guiding means (9) for guiding the cutting wire (3) when being wound up on the storage spool (2), such that the wire windings on the storage spool (2) do not overlap each other and/or have a lower density than the windings on the reservoir spool (1).

22 Claims, 17 Drawing Sheets

(58) Field of Classification Search
USPC .................................................. 125/16.02, 21
See application file for complete search history.

(56) References Cited

U.S. PATENT DOCUMENTS

| | | | |
|---|---|---|---|
| 5,287,774 A | 2/1994 | Seifert | |
| 5,628,301 A * | 5/1997 | Katamachi | B23D 57/0053 125/16.01 |
| 5,771,876 A | 6/1998 | Egglhuber | |
| 5,829,424 A * | 11/1998 | Hauser | B28D 5/045 125/16.01 |
| 6,237,585 B1 * | 5/2001 | Oishi | B23D 57/0069 125/16.02 |
| 6,390,896 B1 * | 5/2002 | Huber | B23D 57/0053 125/12 |
| 6,837,778 B2 * | 1/2005 | Kondo | B23D 57/0053 125/16.01 |
| 6,945,242 B2 * | 9/2005 | Kondo | B23D 57/0053 125/21 |
| 8,881,716 B2 * | 11/2014 | Hoshiyama | B23D 57/0069 125/16.02 |
| 8,991,381 B2 * | 3/2015 | Ohya | B23D 57/0069 125/16.01 |
| 2005/0155595 A1 * | 7/2005 | Kondo | B23D 57/0053 125/21 |
| 2007/0023027 A1 * | 2/2007 | Nakai | B23D 57/0061 125/21 |
| 2008/0264228 A1 | 10/2008 | Huber et al. | |
| 2010/0006082 A1 * | 1/2010 | Glinski | B28D 1/30 125/16.02 |
| 2013/0061842 A1 * | 3/2013 | Junge | B28D 5/045 125/21 |

FOREIGN PATENT DOCUMENTS

| | | |
|---|---|---|
| CN | 101628451 A | 1/2010 |
| CN | 102152215 A | 8/2011 |
| DE | 19828420 A1 | 1/2000 |
| DE | 10220640 A1 | 12/2002 |
| EP | 2218532 A1 | 8/2010 |
| JP | H07-314436 A | 12/1995 |
| JP | 2000-024905 A | 1/2000 |
| JP | 2000-158436 A | 6/2000 |
| WO | 20101006148 A2 | 1/2010 |
| WO | 20101128011 A1 | 11/2010 |
| WO | 20121018678 A1 | 2/2012 |

OTHER PUBLICATIONS

International Search Report and written opinion, dated Jun. 2, 2014, from parent International appln. PCT/IB2013/060620 published as WO2014/087340A2 dated Jun. 12, 2014, in English.

* cited by examiner

WIRE MANAGEMENT SYSTEM

This application is a 35 U.S.C. 371 national-phase entry of PCT International application no. PCT/IB2013/060620 filed on Dec. 4, 2013 and also claims benefit of priority to prior European application no. EP12195539 filed on Dec. 4, 2012, and parent PCT International application no. PCT/IB2013/060620, is incorporated herein by reference in its entirety for all intents and purposes, as if identically set forth in full herein.

The present disclosure refers to a wire management system for a wire saw having a cutting wire which is guided through a cutting area, to a wire saw and to a cutting method.

This disclosure particularly relates to the fixed abrasive sawing technology. Nowadays, wafers for semiconductor application, solar cells or LEDs, are cut more and more using fixed abrasives. No longer are abrasives suspended in slurry that are transported by a metal wire to make a cut. The abrasives are directly attached to the metal wire. Such wire is called fixed abrasive wire (e.g. diamond wire).

These sawing technologies are used in the industry of semiconductors, electronic components, photovoltaics, optical components and photonics. Typical (brittle) materials sawn are GaAs, germanium, polycrystalline or monocrystalline or mono-like silicon, InP, quartzes, sapphire or other ceramic materials.

The wire guiding rolls of a wire saw are polyurethane coated having grooves on the wire receiving surface for guiding the cutting wire. The diamond wire is webbed over the wire guiding rolls in those grooves. The pitch of the grooves (i.e. distance over which the groove pattern repeats itself) together with the wire diameter that is used, will determine the thickness of the sawn wafers.

The cost of the process of fixed abrasive wafering can be reduced considerably if the fixed abrasive wire can be continuously used in consecutive cuts even though part of the wire web was already used in a previous cut on condition that the remaining sawing capability of that used wire hasn't decreased too much. The sawing capability can be measured by the wire deflection (bow of the wire) in the process. Wire that has lost its sawing potential will deflect more (have a higher bow) than fresh, unused wire.

It is common to cut silicon with diamond wire by moving the cutting wire in two directions. The wire is moved back and forth just like with a normal hand saw. Usually the forward cut (wire moves from a supply spool to a receiving (or disposal) spool is slightly longer than in the opposite direction. This is the so-called pilgrim mode. The pilgrim mode leads to an intermittent addition of new, unused wire. This seems not surprising, but since for slurry cutting the wire normally only moves in one direction, pilgrim mode used not to be the usual way of cutting.

Before starting the cutting process the cutting wire is placed in the wire saw. Prior art document CH691292A5 shows in FIG. 1 a wire saw having a wire management system, the wire saw being ready to cut. In order to make the pilgrim motion, cutting wire is spooled off from a supply spool, runs thru the cutting area thereby forming a wire web, and is then spooled onto a receiving spool (disposal spool). Normally, the supplying spool, the receiving spool and the wire guide roller forming the wire web are driven.

The wire runs in one direction for e.g. 500-600 meters, i.e. 500-600 additional meters are spooled off the supply spool and onto the receiving spool as compared to the starting point, but only e.g. 490 to 590 meters are spooled back from the receiving spool to the supply spool. In this way new wire is fed to the wire web. Once a cutting wire portion no longer reaches the work piece to be cut (i.e. more cutting wire is fed in behind this portion so that when the wire moves back, it does not reach the work piece any more), the wire should be exhausted: the diamonds on the cutting wire a grinded down or have detached from the wire.

It was found that the multiple overlapping windings of the cutting wire on the supply spool and the receiving spool cause damages to the wire. The friction arising between the uppermost wire portion leaving the spool or arriving at the spool and the wire portions arranged below reduces life time of the wire and thus increases costs. Friction arises when the wire is spooled over itself.

JP2000-158436A discloses a wire management system having subsequent to the supply spool an intermediate wheel. Cutting wire is spooled off from the supply spool, then runs to an intermediate wheel before running to the wire web. When the wire leaves the wire web, it goes to a second intermediate wheel before it is spooled onto the receiving spool. Clearly, cutting wire can be fed thru the wire web as long as the intermediate wheel can supply cutting wire without introducing new wire from the supply spool. Moreover, if the diameter of the intermediate wheel is D, $\pi$D wire can be used for cutting without the need of rotating the supply spool and receiving spool. However, the length of the wire portion which may be temporarily stored on the intermediate wheel is very short. For an effective Pilgrim mode it is necessary to travel the cutting wire some hundred meters before reversing the direction, e.g. 500 or 600 meters. Therefore, the system disclosed in JP2000-158436 is not suited for cutting up to 300 wafers simultaneously. Furthermore, the wire could not reach its maximal speed before it has to decelerate and change direction. Since cutting efficiency also depends on the speed of the wire, this would lead to the undesirable result that the wire (and actually all pulleys and rolls) would have to be accelerated very often. This would result in a low average wire speed which is not good for cutting and would require a lot of energy.

JP2000-024905A discloses wire saw having a wire management system. Intermediate capstan drums are used for reducing the tension in the cutting wire so that the wire is spooled onto the supply and receiving spools with less tension. This may prevent the pulleys and rolls from wearing down too fast. However, since the tension in the wire cannot be reduced to zero, the wire will still harm itself as it is wound onto and off the reservoir spools. Furthermore, each of these intermediate drums requires a separate drive having a highly dynamical control.

The problem of this system consists in the fact that the wire has to be held under tension the whole time. Otherwise it would have undefined behavior. This document also does not solve the problem of the windings getting caught with each other. The wire gets worn during the winding procedure. The sharp unused wire having a large tension gets in friction with the wire windings below.

An object of the present disclosure is to overcome these problems and to provide a wire management system which prevents the cutting wire from damage. The wire management system should particularly prevent wire breakage due to relative movement of the wire (wire to wire friction/scraping) on the spools. The life time of the cutting wire should be increased by a wire management of low wear. Low wear wire management allows to use the same wire portion much longer than in prior art. Thus also the cycles of adding new cutting wire portion should be extendable by the invention. Finally, the wire management system itself should be easy in construction, place-saving and cost-effective. With the wire management system it should be possible to store a large wire quantity at low space requirements.

One especially big advantage of having more wire on the reservoir spool for new wire (large reservoir storage) would be the following: the last portion of the wire cannot be used up completely. Before this part reaches that state a predecessor part of that portion would have been worn down completely what would lead to wire breakage. The very first and very last portion of the wire cannot be used at all for cutting since it cannot reach the wire web at all: it is attached to the reservoir spool and cannot be moved to/through the wire web. Altogether, the first and last portion of the wire cannot be used efficiently. Clearly making the wire on the reservoir spool long, will reduce the percentage of the portion of wire that is not used efficiently. Moreover, the wire on one reservoir spool has two such portions, whereas two spools with the same amount of wire in total have four such portions, doubling the loss.

This object is achieved by a wire management system for a wire saw having a cutting wire which is guided through a cutting area, the wire management system comprising a wire supplying unit for supplying cutting wire to the cutting area of the wire saw and a wire receiving unit for receiving cutting wire from the cutting area of the wire saw, wherein at least one of the wire supplying unit and the wire receiving unit comprises:
   at least one rotatable reservoir spool for carrying the cutting wire in overlapping windings,
   at least one rotatable storage spool for temporarily receiving the cutting wire in windings, wherein the rotational axis of the storage spool coincides with the rotational axis of the reservoir spool,
   a wire guide for guiding the cutting wire when being wound up on the storage spool, such that the wire windings on the storage spool do not overlap each other and/or have a lower density than the windings on the reservoir spool.

The wire management system efficiently reduces the risk of wire breakage, increases the life time of the cutting wire, reduces unwanted loss of abrasive particles such as diamonds from the wire. This is achieved by reducing the wear of the cutting wire during the cutting procedure.

The reservoir spool allows to carry a large amount of cutting wire in overlapping windings. The storage spool allows to carry the cutting wire in non-overlapping windings. The storage spool temporarily carries that wire portion which is used during a Pilgrim cycle, i.e. cutting wire is moved in a first direction and then reversed. During winding and/or unwinding the cutting wire from the storage spool the wire is not spooled on a reservoir of multiple windings but is directly in contact with the wire contact surface of the storage spool.

The present disclosure also allows to manage a large wire quantity (i.e. very long wire sections) within a Pilgrim cycle. Nevertheless, it is possible to add any desired amount of a new wire to and/or to remove any desired amount of used wire from that wire portion which runs in one or more cycles through the cutting area.

"Essentially coinciding" means that the rotational axis are essentially aligned in a line. Small deviations of an exact same line are of course within the scope of the present invention. It is preferred that during cutting the orientation of the spools does not diverge greatly and their relative orientation (alignment) stays within 5 degrees, more preferably within 2 degrees, most preferably within 1° degrees.

"Density of wire windings" means the number of wire windings per unit length along the axis of the spool.

Preferably on the storage spool no more than 10 windings overlap with each other, preferably no more than 5 windings overlap and ideally no wires overlap. That is, in the most preferred embodiment the cutting wire is carried throughout the storage spool in non-overlapping windings, preferably over at least the largest part of the storage spool.

The rotational speeds of the reservoir spool and the associated storage spool is during the predominant phase of the cutting cycles essentially equal. Only when the wire is wound consecutively on two spools (first reservoir spool and then storage spool or vice versa) the speed of the wire receiving surface is important. Moreover, if the surface speeds of the reservoir spool and the storage spool are not identical, the wire will have to be accelerated or decelerated as it adapts the speed of the spool it is wound onto. Since the diameter of the reservoir spool changes as the wire is used up, this speed difference has to be mitigated by changing the rotational speed, by a tensioning system for the wire or both. After the transition, the rotational speeds should be identical except for small adjustments in the tension in the wire crossing from one spool to the next.

The wire guide is movable along the axis of the storage spool and/or along the axis of the reservoir spool.

In an embodiment it would be possible to wind up the cutting wire in overlapping windings also to the storage spool. However, it is desirable to keep the density of windings on the storage spool much smaller than the windings on the reservoir spool. In the preferred embodiment the cutting wire is carried throughout the storage spool in non-overlapping windings.

The low wear of the cutting wire is caused by the use of a storage spool with a lower winding density or non-overlapping windings at all. The longer life time of the cutting wire allows to reduce the addition of new wire portions during the Pilgrim cycles.

A preferred embodiment according to the present disclosure allows the use of a diamond cutting wire having a large diamond density. Typically wires have around 600 diamonds per $mm^2$. Wires with high density may have 800 or even more diamonds per $mm^2$ on its surface. Preferably, the diamond density amounts to at least 800, more preferred at least 1.000 diamond grains per $mm^2$ cutting wire surface. The spooling from/on the storage spool of non-overlapping (or few overlapping) windings is very gentle for the cutting wire (i.e. the wear originating from spooling up and spooling off is negligible). The abrasion and detaching of diamonds can be avoided.

Usually synchronizers are provided, such that one of the reservoir spool and the storage spool does not rotate faster than the other spool. Such a synchronization may be accomplished mechanically or by a control device. Storage spool and reservoir spool should rotate at least essentially at the same rotational speed, in order to prevent the wire from distorting and/or twisting.

Further advantages according to the present disclosure are:
   clearly not damaging the cutting wire which is essential to the cutting performance of the whole wire saw
   less need for expensive cutting wire, which is the largest cost factor in diamond wire wafering. The consumption of cutting wire is strongly reduced. It is expected that the costs for cutting wire can be reduced up to 50%,
   better wafer quality: the wire stays longer sharp and is deflected much less. This results in better TTV-, SM- and Warp-values,
   faster cutting because the wire stays sharp longer, less down time because the spools have also a longer lifetime and wire breakage occurs less often.

A very simple and space saving construction is achieved by the coinciding rotational axes of the storage spool and the reservoir spool. The run of the cutting wire from one spool to the other spool may be realized in an uncomplicated way.

The wire guide is preferably adapted to facilitate the incremental addition of new wire of the reservoir spool of the wire supplying unit to the cutting area and/or to dispose worn wire to the reservoir spool of the receiving unit.

The storage spool and the reservoir spool are arranged such that one end of the storage spool faces towards one end of the reservoir spool. The rotational axes coincides with the spool axes.

Preferably, the diameter of the wire carrying surface of the storage spool is larger than the diameter of the wire carrying surface of the reservoir spool. This allows to hold a large amount of wire in the reservoir spool in multiple overlapping windings. On the other hand the wire does not overlap on the storage spool and such the diameter can be larger. A larger diameter also allows to temporarily store a larger amount of wire in non-overlapping manner. In a preferred embodiment of the invention the diameters of the storage spool and the reservoir spool in the transition region are essentially the same. This allows an undisturbed transition when taking of cutting wire, i.e. when changing the take-off from one spool to the other spool. In a most preferred embodiment the diameter of the storage spool and the diameter of the reservoir spool are essentially identical.

In an alternate embodiment, the wire carrying surface of the storage spool may have about the same diameter as the wire carrying surface of the reservoir spool or the diameter of the reservoir spool being fully loaded with cutting wire has the same or larger diameter than the wire carrying surface of the storage spool. As the reservoir spool uncoils, the diameter of the wire winding top surface diminishes. On average (over the time a spool with new wire is used) the difference between the wire winding top surface of the reservoir spool and the wire carrying surface of the storage spool is kept as small as possible. The wire carrying surface is that surface of the spool being in contact with the wire and the wire winding top surface is the top surface formed by the wire windings on that spool.

Preferably, the length of the wire carrying surface of the storage spool is larger than the length of the wire carrying surface of the reservoir spool. This allows the temporary storage of a large amount of cutting wire.

Preferably, the reservoir spool is mounted to the storage spool, preferably in a detachable manner. When inserting a completely new cutting wire into the wire saw an empty reservoir spool may be easily exchanged by a new reservoir spool loaded by new cutting wire.

Preferably, the reservoir spool is formed sleeve-like and put over an end region of the storage spool. In such a manner the detachable reservoir spools may be constructed light weighted and cost effective and may be easily and concentrically mounted to the storage spool.

Preferably, at least one of the wire supplying unit and the wire receiving unit includes a synchronizer being capable of synchronizing the rotational speed of the reservoir spool and the rotational speed of the storage spool with each other. This allows an optimized wire management, since all wire portions which are wound on the reservoir spool and the storage spool rotate at the same speed.

The reservoir spool and the storage spool may be mounted on a common axle. The axle may be supported between the reservoir spool and the storage spool by a support. In this way the reservoir spool can be mounted from one side only and thus being readily exchangeable. The mounting further can have a (static or rotating, free or forced) slanted or tapered portion that facilitates the cross-over of the wire from the reservoir spool to the storage spool and vice versa. Preferably, the common axle is a machine axle, e.g. a common machine shaft.

Preferably, the synchronizer is a fixed connection between the storage spool and the reservoir spool and wherein the storage spool and the reservoir spool have a common rotational drive. Such a mechanical connection, which is a torque-proof connection, guarantees optimal synchronization of the spools.

Preferably, each of the storage spool and the reservoir spool has its own rotational drive and wherein the synchronizer is a control device connected to the rotational drives. If both spools have individual drives, the rotational speed may be temporarily changed to equalize the 'surface speed' or circumferential speed (circumference where the wire is wound on). In this way the shock in the wire can be reduced when changing between spools. However, during most time of the cutting procedure the rotational speed must be equal.

Separate drives allow to take up the jump in the wire velocity when changing between the spools. The transition between the spools is done preferably at very low rotational speeds such that other shock dampers such as a dancer pulley (maybe electrically driven) may easily compensate the occurring forces. The traveler pulley may hold the tension of the wire within given tolerances. The reservoir spool and the storage spool have normally the same rotational speed. Just in the transition area a slight deviation between the rotational speeds may be desired. This may be achieved by a control device which controls the separate drives.

In the transition area between reservoir spool and storage spool an elastic material may be provided to damp the change in wire tension. It is important that the reservoir spool and the storage spool move synchronized with each other during the cutting procedure, thus avoiding wire breakage.

The storage spool and/or the reservoir spool may have a transition area facilitating the transition of the wire from one spool to the other. This area is not used for storing wire, but for making the transition smooth.

Preferably, the transition area between the storage spool and the reservoir spool has a tapered or rounded shape, wherein preferably the transition area is formed by a separate member being inserted between storage spool and reservoir spool. This allows a smooth transition of the wire from the reservoir spool to the storage spool. Preferably the transition area is formed of elastic material.

Preferably, the wire guide comprises a traveler pulley which is movable along the rotational axis of the storage spool. The linear movement of the traveler pulley allows to wind the wire on the storage spool in a defined manner, preferably in non-overlapping windings. The path of the traveler pulley preferably extends over the length of the storage spool and over the length of the reservoir spool, such that wire can be directly taken from the reservoir spool when adding new wire.

Preferably, the wire guide comprises at least one helical wire guiding groove on the wire carrying surface of the storage spool. This allows to prevent winding in undefined manner.

Preferably the storage spool is a drum. The drum has preferably a relatively soft sheath or mantle (e.g. 98° shore). The soft mantle can be replaced. The storage spool may have an elastic coating that can be lathed or grinded several times to smooth the surface so that the drum can be used multiple times before the mantel has to be replaced.

As already mentioned above the storage spool may have a mantle with a helical wire guiding groove. Since the wire has to be placed in a spiral around the spool, it is important that the wire stays in the right place. A helical groove may efficiently support this object.

The object is also achieved by a wire saw for cutting a piece of material, preferably semiconductor material, such as an ingot, brick or core, the wire saw has a cutting area, guides for guiding the cutting wire through the cutting area and drives for driving the cutting wire in opposite directions characterized in that the wire saw comprises a wire management system according to one of the embodiments described above. The work piece may be any material, typically brittle material such as sapphire, Boron, glass, quartz, silicon, etc.

The wire saw maybe used for cutting wafers (wire web), bricking (mesh of wires such as e.g., disclosed in WO2010/128011A1), cropping, squaring (making round ingots square or semi-square, i.e. typical mono-crystalline shape with slanted corners), cutting rods and/or any other cutting action of brittle materials.

The cutting wire of the wire saw extends between the reservoir spool of the supplying unit and the reservoir spool of the receiving unit. That is, the ends of the wire are fixed on the reservoir spools. In between those spools, the wire forms in the cutting area a cutting portion (e.g. a wire web or a single cutting range) for cutting a work piece.

Preferably, the wire saw comprises at least two wire guide rollers forming from the cutting wire a wire web.

The invention may however also be used for squaring, bricking and cropping. The cutting field may contain a single wire or multiple wires that are adjacent or are crossed. The distance between the wires may be less than one millimeter (e.g., wafering) or more than 10 centimeters (e.g., bricking). In this application the term wire saw refers to all these types of saws.

The object is also achieved by a cutting method of cutting a piece of material, preferably semiconductor material, such as an ingot, brick or core, with a wire saw as mentioned above, wherein the moving direction of the cutting wire through the cutting area is alternately reversed, wherein during the movement of the cutting wire in a first direction, cutting wire is unwound from the storage spool of one of the wire supplying unit and the wire receiving unit.

Preferably, the movement of the cutting wire in the first direction is proceeded until at least 60%, preferably at least 80% of the length of the wire carrying surface of the storage spool is free from cutting wire, and then the moving direction of the cutting wire is reversed. The wire may at least partially remain on the wire carrying surface of the storage spool so that it guides the wire when the direction is changed.

Preferably, during the movement of the cutting wire in the first direction, cutting wire is wound up on the storage spool of the other of the wire supplying unit and the wire receiving unit, and/or wherein the movement of the cutting wire in the first direction is reversed when still at least 40%, preferably at least 20% of the length of the wire carrying surface of the storage spool is free from cutting wire.

Preferably, the movement of the cutting wire in the first direction is proceeded until the whole wire carrying surface of the storage spool is free from cutting wire and a portion of new cutting wire is unwound from the reservoir spool.

Preferably, the cutting wire is a wire having fixed abrasives, preferably a diamond wire.

The wire may be a structured wire, e.g. as known from CN101628451A, and/or from CN102152215A.

From WO2012/018678A1 there is known a wire that uses nanotubes as abrasive particles.

Basically, every kind of cutting wire which is sensitive to being wound on and of a spool under tension will benefit from the present invention.

An embodiment of the cutting method is characterized in that unused wire is added to the cutting section, preferably in intervals. In a step wire is transferred from the reservoir spool of the wire supplying unit to the storage spool of the wire receiving unit via the cutting area (addition of 'new' wire portion). In another step wire is transferred from the storage spool of the wire supplying unit directly to the reservoir spool of the wire receiving unit via the cutting area (disposing worn wire portion).

The tensioning system for the cutting wire preferably consist of the dancer pulley being movable and mounted on a pulley arm. Preferably a measurement device is integrated for measuring the actual tension. In such a manner a controlled winding process may be achieved by pre-calculating the optimal position of the traveler pulley.

The same holds for the addition of unused wire to the cutting section. The traveler pulley is controlled to take the exact position along the reservoir spool according to the windings.

A control is required to consider exactly the wire pitch on the spools and to prevent that the windings on the storage spool contact each other (non-overlapping). This is also guaranteed at high velocities.

Preferably, during the movement of the cutting wire in a first direction, cutting wire is unwound from the storage spool of a wire supplying unit and transferred to the wire web via the new wire side of the wire web and transferred from the wire web via the used wire side of the wire web to a wire receiving unit and there wound on the storage spool and wherein during the movement of the cutting wire in a second direction, cutting wire is unwound from the storage spool of the wire receiving unit and transferred to the wire web via the used wire side of the wire web and transferred from the wire web via the new wire side of the wire web to the wire supplying unit and there wound on the storage spool.

Preferably, a freely defined piece of used cutting wire is transferred from the wire web via the used wire side of the wire web and wound on the reservoir spool of the wire receiving unit in order to be definitively stored there while a piece of cutting wire of similar length preferably equal length is unwound from the storage spool of the wire supplying unit and transferred to the wire web via the new wire side.

Preferably, a freely defined piece of new cutting wire unwound from the reservoir spool of the wire supplying unit is transferred to the wire web via the new wire side of the wire web in order to partially renew the wire web while a piece of cutting wire of similar length preferably equal length is transferred from the wire web via the used wire side and wound on the storage spool of the wire receiving unit.

Preferably, after winding the cutting wire on the reservoir spool of the wire receiving unit the cutting wire keeps moving in the same direction through the cutting area while it is directed by the wire guide to be subsequently wound on the storage spool of the wire receiving unit.

Preferably, after completely unwinding the cutting wire from the storage spool of the wire supplying unit the cutting wire keeps moving in the same direction through the cutting area while it is directed by the wire guide to be subsequently unwound from the reservoir spool of the wire supplying unit.

Preferably, the wire speed of the cutting wire is reduced below 20%, preferably below 5% of the maximal wire speed while being directed by the wire guide from the storage spool to the reservoir spool and vice versa.

Preferably, the movement of the cutting wire in the first direction is continued until at least 80%, preferably almost 100% of the length of the wire carrying surface of the storage spool of the supplying unit is free from cutting wire, and then the moving direction of the cutting wire is reversed and subsequently the movement of the cutting wire in the second direction is continued until at least 80%, preferably almost 100% of the length of the wire carrying surface of the storage spool of the receiving unit is free from cutting wire.

Preferably, over the time one piece of used cutting wire after the other is deposited on the reservoir spool of the wire receiving unit until the reservoir spool of the wire supplying unit is completely empty and subsequently has to be exchanged by a new and full reservoir spool and equally the filled up reservoir spool of the wire receiving unit has to be exchanged by an empty reservoir spool.

Preferably, during a first cutting cycle, comprising a plurality of reversals of the moving direction of the cutting wire, the moving direction of the cutting wire is reversed before the cutting wire is completely unwound from the storage spool of the supplying unit, such that during the first cutting cycle a section of cutting wire, preferably an unused section of cutting wire, remains on the storage spool of the supplying unit without reaching the cutting area, and wherein during a second cutting cycle, comprising a plurality of reversals of the moving direction of the cutting wire, the moving direction of the cutting wire is reversed such that a section of cutting wire which during the first cutting cycle remained on the storage spool of the supplying unit without having reached the cutting area is fed towards and preferably brought into the cutting area. Preferably the moving direction of the cutting wire is reversed during the second cutting cycle before the cutting wire is completely unwound from the storage spool of the receiving unit, such that during the second cutting cycle a used section of cutting wire is stored on the storage spool of the receiving unit without reaching the cutting area.

This embodiment allows to cut a piece of material by subsequent cutting cycles, each cutting cycle using a different section of cutting wire, that may or may not overlap. If a section of cutting wire is completely worn down (by abrasion of particles, e.g. diamonds) an adjacent section of cutting wire may be used. Such an unused section may be found on the storage spool of the supplying unit. Initially, there is enough wire stored on the storage spool of the supplying unit to provide wire length for at least two different cutting cycles. The changeover from a (used) section to a (unused) section may be done without winding new (unused) wire from the reservoir spool of the supplying unit and without winding old (used) wire onto the reservoir spool of the receiving unit. In such a manner transitions between the storage spool and the reservoir spool is avoided during a cut (i.e., completely cutting through a piece of material, an ingot, brick or core).

In this embodiment the force or pressure on the material to be cut is more uniformly distributed throughout the cutting cycles. The addition of new wire does not change the force or pressure, since it is taken form the same spool, i.e. storage spool, with the same diameter and no sudden changes in wire tension occur. The wire on the storage spool has approximately the same tension as the wire in the wire web (e.g. 20 N-25 N). However, the wire on the reservoir spool has usually a smaller tension (7 N). According to the above embodiment there are no changes in cutting wire velocity, tension of the cutting wire, etc., since the wire is taken from the same spool. Thus deviations from an ideal cut of the wafers due to an inhomogeneous spool surface such as rills (grooves in axial direction of the wire), etc. may be avoided efficiently.

Preferably, the cutting method includes a step of transferring a used section of cutting wire from the storage spool of the receiving unit to the reservoir spool of the receiving unit, wherein the step of transferring is preferably done by completely unwinding the used section of cutting wire from the storage spool of the receiving unit (i.e., temporarily moving it towards or into the cutting area) followed by reversal of the moving direction of the cutting wire and winding the used section of cutting wire on the reservoir spool of the receiving unit. In this embodiment a separate step is performed for removing the wire temporarily stored on the storage spool of the receiving unit to the respective reservoir spool.

Preferably, the step of transferring a used section of cutting wire from the storage spool of the receiving unit to the reservoir spool of the receiving unit is done between two successive cuts. In this embodiment the cut of materials is not influenced by this step of transferring, since it is performed between two cuts, i.e. when there is no material (to be cut) in contact with the wire web (cutting area).

Another aspect according to the present disclosure relates to the non-uniform abrasion of the cutting wire. Usually cutting wire is used section-wise, i.e. in a first cutting cycle a first section of cutting wire is used (i.e. brought in contact with the piece of material to be cut) and in a subsequent cycle a subsequent section of cutting wire is used for cutting. It was recognized that the sections of cutting wire are objected to a non-uniform abrasion particularly in the end regions of that sections, leading to a loss of cutting wire which is still "sharp", i.e. to a sub-optimal exploitation of cutting wire.

This problem is solved by a cutting method of cutting a piece of material, preferably semiconductor material, preferably in form of an ingot, brick or core, particularly according to one of the embodiments described above, with a wire saw comprising a wire management system having a cutting wire which is guided through a cutting area, the wire management system comprising a wire supplying unit for supplying cutting wire to the cutting area of the wire saw and a wire receiving unit for receiving cutting wire from the cutting area of the wire saw, wherein during a first cutting cycle, comprising a plurality of reversals of the moving direction of the cutting wire, a first section of cutting wire is used in the cutting area for cutting the piece of material, the first section being defined by all wire points which between the reversals of the first cutting cycle at least once come into contact with the piece of material to be cut, and wherein during a second cutting cycle, comprising a plurality of reversals of the moving direction of the cutting wire, a second section of cutting wire is used in the cutting area for cutting the piece of material, the second section being different to the first cutting section and being defined by all points which between the reversals of the second cutting cycle come into contact with the piece of material to be cut, and wherein the first section of cutting wire and the second section of cutting wire overlap in their end regions.

In principle, this aspect according to the present disclosure is independent of the embodiments described above. Supplying unit and receiving unit can be constructed in a different way, e.g. may each comprise only a storage spool (no additional reservoir spool). However, a combination with one of the previously described embodiments yields a preferred embodiment.

This cutting method allows to optimally exploit the cutting wire, particularly also the end regions of the cutting wire sections used within a cutting cycle. The principle will be explained in detail below and with respect to corresponding figures.

Preferably, the overlapping range is located outside a range of wire points having between two successive reversals of the cutting wire within a cutting cycle essentially the same effective interaction length with the piece of material. Moreover, sections of the wire that completely transverse the wire web during cutting, but remain between the wire guide rolls, say complete usage sections, on average all have the same wear. Their interaction length is all the same. Ideally the second cutting section starts at the end of the complete usage section of the first cutting cycle. In that way the regions with less wear overlap. Surprisingly it was found that in this way the reduced wear of the overlapping sections adds up to the same amount of wear as in the complete usage section. In this embodiment wearing of a cutting wire section above an acceptable limit is prevented. It is apparent for the artisan skilled in art, that a control unit is provided for carrying out the methods according to the above embodiments. The control unit particularly controls the cutting cycles, reversals, pilgrim lengths, wire tension, etc.

Figure 2:
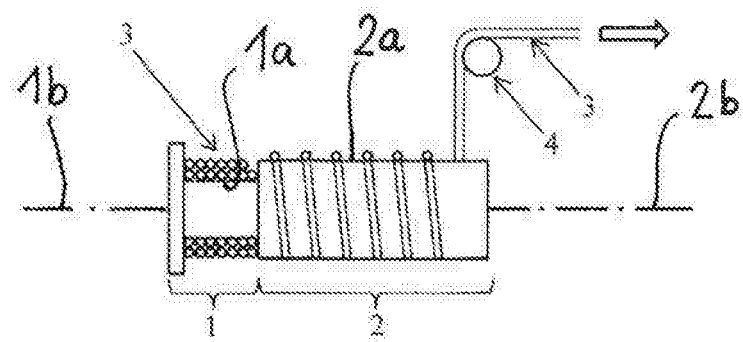
Figure 3:
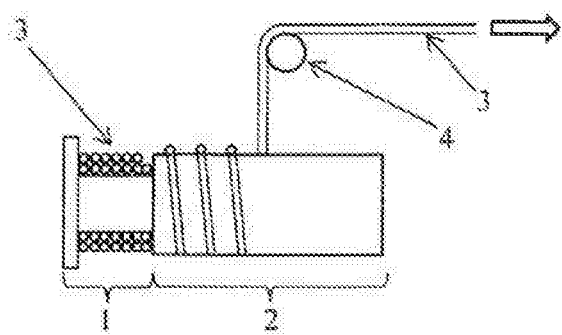
Figure 4:
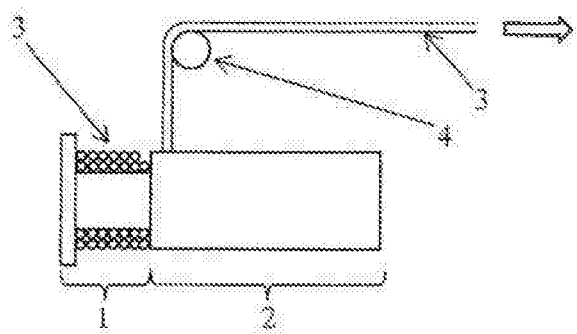
Figure 5:
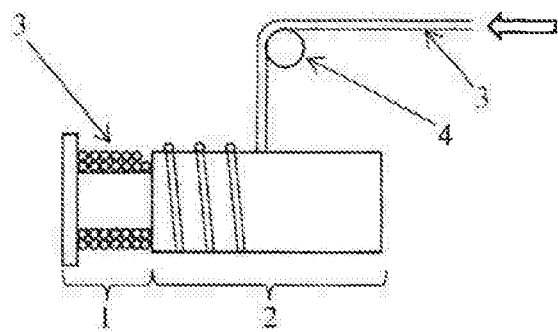
Figure 6:
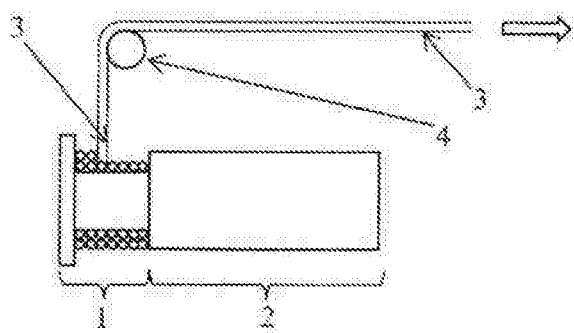
Figure 7:
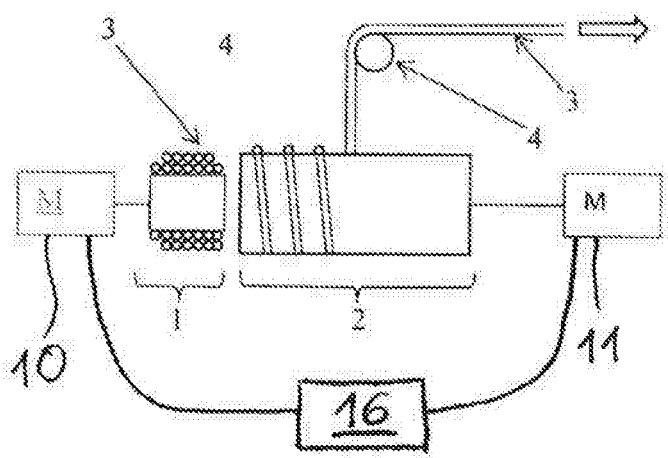
Figure 8:
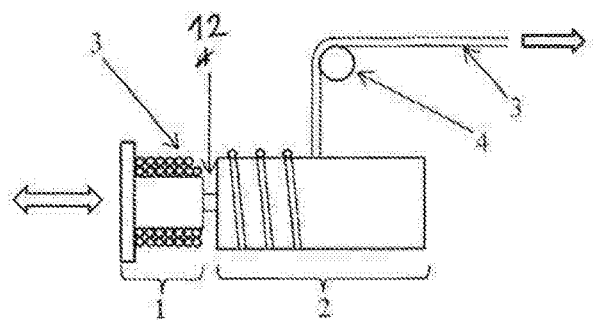
Figure 9:
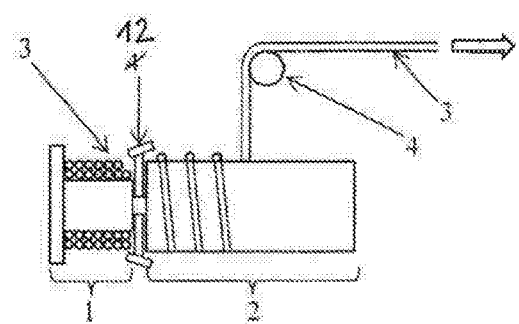
Figure 10:
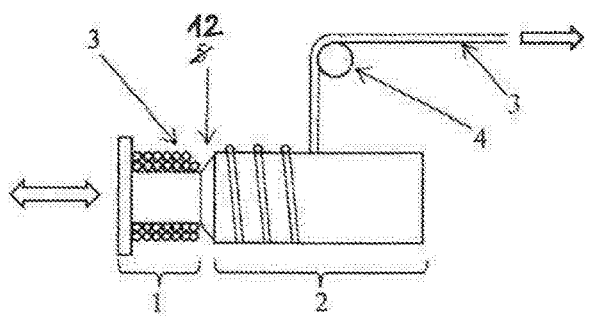
Figure 11:
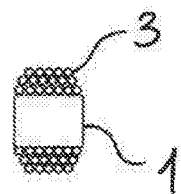
Figure 20:
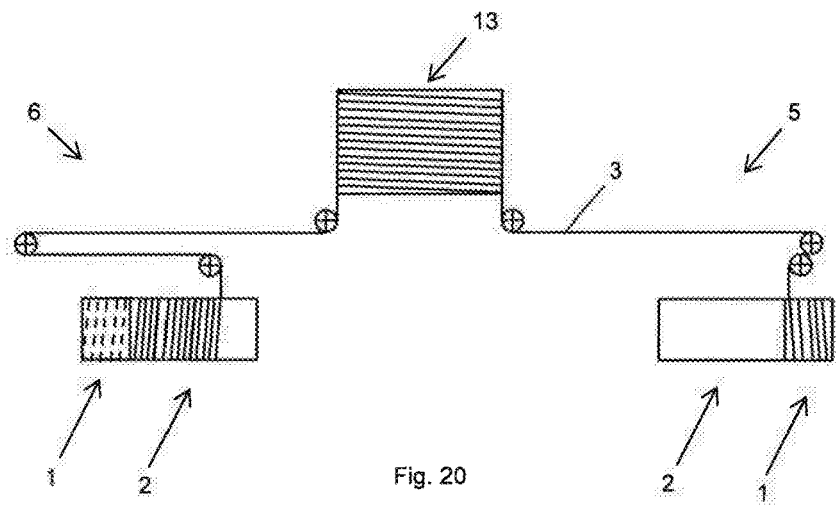
Figure 21:
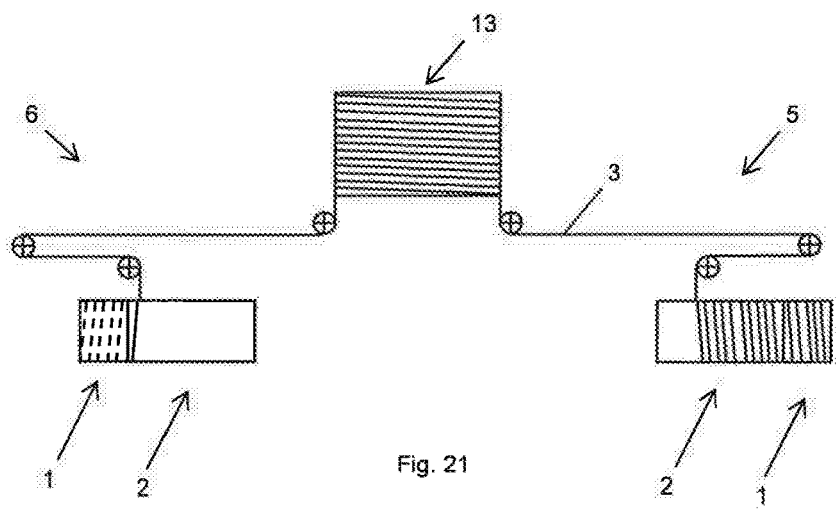
Figure 22:
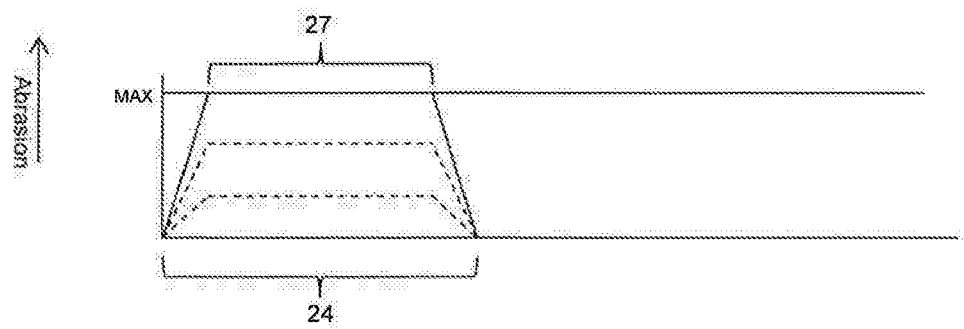
Figure 23:
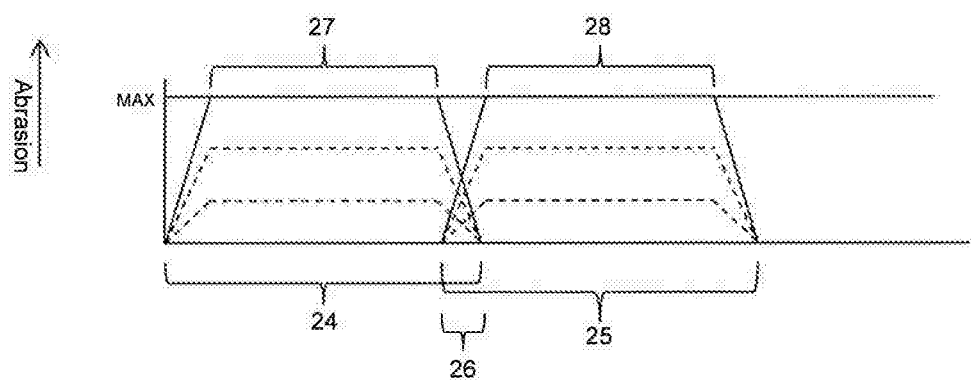

Further embodiments according to the present disclosure are indicated in the figures and in the remaining disclosure, including drawings. The list of reference marks forms part of the disclosure. The invention will now be explained in detail by the drawings. In the drawings:

FIG. 1 shows a wire saw having a wire management system according to the invention, FIG. 2 shows a wire management system with the storage spool carrying a cutting wire portion, FIG. 3 shows the wire management system of FIG. 2 with the cutting wire being partially unwound from the storage spool, FIG. 4 shows the wire management system of FIG. 2 with the cutting wire being completely unwound from the storage spool, FIG. 5 shows the wire management system of FIG. 2 with the cutting wire being partially received by storage spool, FIG. 6 shows the wire management system of FIG. 2 with the cutting wire being unwound from the reservoir spool, FIG. 7 shows an embodiment of the wire management system each spool having a separate rotational drive, FIG. 8 shows an embodiment in which the storage spool and the reservoir spool are fixedly connected with each other, FIG. 9 shows an embodiment in which the transition area between the spools has guide elements for a smooth transition of the cutting wire, FIG. 10 shows an embodiment in which the transition area has tapered shape, FIG. 11 shows a reservoir spool without flanges, FIGS. 12*a* to 12*m* show the steps of an inventive cutting method, FIGS. 13*a* to 13*l* show the steps of an alternative inventive cutting method, FIGS. 14 to 21 show the steps of an embodiment of the cutting method, and FIGS. 22 and 23 the wear or abrasion of cutting wire sections.

FIG. 1 shows a wire saw 8 for cutting a piece of material, preferably semiconductor, sapphire or quartz material in form of an ingot, brick or core. The wire saw 8 has a cutting area 13 and wire guide rollers 14 guiding the cutting wire 3 through the cutting area 13 thereby forming from the cutting wire 3 a wire web. The wire saw 8 comprises drives 15 for alternately driving the cutting wire 3 in a first direction and a second direction which is opposite to the first direction. The wire saw according to present disclosure may also have wires crossing each other as is the case in a squarer. In addition, the cutting web in the cutting area may also consist of a single wire.

Wire saw 8 has a wire management system 7 comprising a wire supplying unit 5 for supplying cutting wire 3 to the cutting area 13 of the wire saw 8 and a wire receiving unit 6 for receiving cutting wire 3 from the cutting area 13 of the wire saw 8. In a so-called "Pilgrim mode", the moving direction of the wire 3 is alternately reversed such that also the supplying unit 5 has a receiving function and the receiving unit 6 has a supplying function depending on the actual moving direction. According to the shown embodiment, however, when adding new cutting wire portions to the cutting area 13, this is done by winding an additional wire portion from the supplying unit 5, the supplying unit 5 comprising the reservoir spool 1 with new wire. The receiving unit 6 comprising a reservoir spool 1 for collecting used up wire for disposing of it.

In the embodiment of FIG. 1 both supplying unit 5 and receiving unit 6 are of similar construction.

Each unit comprises a rotatable reservoir spool 1 for carrying the cutting wire 3 in overlapping windings and a rotatable storage spool 2 for temporarily receiving the cutting wire 3 in windings (not shown). Preferably the windings on the storage spool 2 do not overlap.

As can be seen from FIG. 2, the rotational axis 2*b* of the storage spool 2 coincides with the rotational axis 1*b* of the reservoir spool 1.

Each unit comprises a wire guide 9 adapted for guiding the cutting wire 3 when being wound up on (or wound from) the respective storage spool 2, such that the wire windings on the storage spool 2 do not overlap each other and/or have a lower density than the windings on the reservoir spool 1. In the present embodiment, the wire guide 9 is a traveler pulley 4 which is movable in a direction which is essentially parallel to the rotational axes of the spools 1, 2.

FIG. 2 shows a supply unit 5 (or a receiving unit 6) in more detail. The diameter of the wire carrying surface 2*a* of the storage spool 2 is larger than the diameter of the wire carrying surface 1*a* of the reservoir spool 1. The length of the wire carrying surface 2*a* of the storage spool 2 is larger than the length of the wire carrying surface 1*a* of the reservoir spool 1.

FIG. 2 shows the a situation in which storage spool 2 is almost completely wound with cutting wire 3. When moving the cutting wire 3 in the direction of the cutting area 13 (FIG. 13) wire is successively unwound from the storage spool 2. In FIG. 3 the cutting wire is partially unwound from storage spool 3 and in FIG. 4 storage spool 2 is free from cutting wire 3. During the unwinding procedure traveler pulley 4 continuously runs from right to left.

The wire supplying unit 5 and the wire receiving unit 6 each comprises a synchronizer capable of synchronizing the rotational speed of the reservoir spool 1 and the rotational speed of the storage spool 2 with each other. In the FIGS. 3 to 6 and 8 to 10 the synchronizer includes a fixed mechanical connection between the spools 1, 2. This ensures here, that the spools 1, 2 have the same rotational speed. In this case the storage spool 2 and the reservoir spool 1 have a common rotational drive.

In an embodiment shown in FIG. 7 each of the storage spool 2 and the reservoir spool 1 has its own rotational drive 10, 11, e.g. a motor. In this embodiment the synchronizer is a control device 16 connected to both the rotational drives 10, 11 and controlling their rotational speed. If a synchronizer is used for synchronization, the reservoir spool 1 and the storage spool 2 may be accelerated or decelerated independently to compensate of the difference in the diameter of their wire receiving surfaces or their wire windings top surfaces, respectively. Since the spools 1, 2 can be rotated independently, their speeds may also be changed independently and even in time parallel. Moreover, if the wire receiving surface of the storage spool 2 has a greater diameter (than the wire winding top surface on the reservoir spool), the rotational speed of the reservoir spool may be slightly higher so that when the wire crosses over from the reservoir spool to the storage spool, their wire winding top surfaces have the same speed. The same possibility may be used when going from the storage spool 2 to the reservoir spool 1.

Preferably, the reservoir spool 1 is mounted to the storage spool 2 in a detachable manner. This may be accomplished e.g. by a de-lockable snap-action mechanism. When supplying new wire to the wire saw, a complete spool can be attached to the storage spool or to a common axle.

In the embodiments of FIGS. 8, 9 and 10 a transition area 12 between the storage spool 2 and the reservoir spool 1 is provided. The transition area 12 may be a simple connection rod (FIG. 8) or may comprise guide elements for protecting the cutting wire in the transition area 12 (FIG. 9).

In FIG. 10, the transition area 12 has a tapered shape. The transition area 12 may formed by a separate member being inserted between storage spool 2 and reservoir spool 1 and may be soft to protect the wire.

The reservoir spool 1 and the storage spool 2 may be mounted on a common axle (FIG. 8). The axle may be supported between the reservoir spool 1 and the storage spool 2 by a support (FIG. 9). In this way the reservoir spool 1 can be mounted from one side only and thus being readily exchangeable. The mounting further can have a (static or rotating, free or forced) slanted portion (FIG. 9) that facilitates the cross-over of the wire 3 from the reservoir spool 1 to the storage spool 2 and vice versa. The support further increases stiffness of the system.

The wire carrying surface 2a of the storage spool 2 may comprise wire guiding grooves with a spiral run.

The reservoir spool 1 and the receiving spool 2 rotate synchronically, i.e. have the same rotational speed. At the start of a new spool of wire, the wire is mostly on the reservoir spool 1 of the supplying unit 5, but to a certain extent also around the storage spool 2. The wire runs over a traveler pulley 4 (which is a roll positioning the wire when spooling wire onto or off a roll) to the wire web. The distal end of the cutting wire 3 is connected to the reservoir spool 1 of the receiving unit 5.

FIG. 11 shows an embodiment of a reservoir spool 1 without flanges on its ends. Arranging the wire 3 in a trapezoid shape will hold the wire in the right place. If there are no flanges, the transition between reservoir spool and storage spool may be facilitated. The flange may also form the tapered shape of the transition area 12.

When the wire 3 starts cutting, the reservoir spool 1 and the associated storage spool 2 rotate (the upper part of both spools moves out of the plane of the drawing of FIG. 2). The wire 3 now rolls off the storage spool and the dancer pulley 20 which is held by pulley arms 21 keeps the tension in the wire constant and more or less perpendicular to the rotational axis of the storage spool 2 and the traveler pulley 4 makes sure that the wire windings are correctly positioned on the spool.

Rotating the storage spool 2 further removes virtually all wire 3 from the storage spool 2. Now there are two options:
a) no addition of a new wire portion from the reservoir spool to the working section. In this case the rotation of the storage spool 2 is reversed before wire is unrolled off the reservoir spool 1 (i.e. storage spool 2 is rotated in opposite direction and the bottom part of storage spool 2 moves out of the plane of the drawing) and the wire 3 is pulled from the wire web and spooled onto the storage spool again.
b) addition of new wire to the working section. The storage spool 2 is rotated further (top side of the storage spool 2 out of the plane of the drawing) so that new wire is spooled off the reservoir spool 1, which synchronically rotates with the storage spool 2. Once the right amount of new wire has been taken off the reservoir spool 1, the method continues as described under point a), winding the used wire onto the storage spool 2 (and at first onto the reservoir spool 1 in order to reach the storage spool 2, if the traveler pulley 4 happens to be in the position as shown in FIG. 6. Ideally, the traveler pulley 4 is not in this position when the wire has to be wound onto the storage spool. Its position may be controlled and monitored such that when the transition takes place, the traveler pulley 4 is located right next to the storage spool. This is e.g. achieved by adding less or more wire from the reservoir spool).

It is important to note that usually:
a wire segment that has gone thru the wire web once has normally not been used up. Therefore this segment is preferably treated as gently as the new wire. Moreover, preferably also the receiving unit 6 has a storage spool 2.
the wire is being decelerated before the direction of the wire movement is reversed. This means that during most of the time the e.g. 500 meters used wire is wound off the storage spool 2, the wire 3 has its maximum speed. Near the end of the used wire part, and thus near the (left) end of the storage spool 2, the wire 3 is decelerated. This slower speed is beneficial for making the transition to the reservoir spool 1. Since the diameters of the wire winding top surfaces on the spools are almost never exactly identical and thus the speeds of the wires on that top surfaces are not the same, the tension in the wire will change rapidly during the transition. The system, especially the dancer has to be fast enough to compensate for this change. At lower speeds, the change is slower and the system can compensate better.

At a transition between the spools the difference in speed may be adjusted, in order to unload the dancer pulley 20 and to avoid an impact. The dancer pulley 20 should come as soon as possible in its neutral position.

Since the diameter of the reservoir spool 1 (actually the diameter of the wire contact surface 1a plus the wire still on the spool) varies over time and the diameter of the storage spool 2 stays constant (beside some wear), the wire may experience a shock during the transition. Only if both, diameter of reservoir spool and storage spool, are constant, there arises no shock. If the wire speed is low, the system used for absorbing shocks in the wire 3 may be fast enough to balance this shock. This system may be comparable to the weights in JP2000-158436A and in JP2000-024905A. An additional shock absorber may be inserted in the path between the reservoir spool/storage spool and the cutting area (e.g. wire web), preferably adjacent to the traveler pulley 4 (upstream or downstream). Another way is to change the relative speed of the reservoir spool and the storage spool, which is possible if both have a drive of their own as shown in FIG. 7. An important thing is to absorb the shock and/or to try keeping the speed of the wire leaving the storage spool and the speed of the wire leaving the reservoir spool a moment later as close together as possible. If the diameters of the wire winding top surfaces on the spools 1 and 2 are quite different, it may be beneficial to not make the speeds as equal as possible. If for example the wire winding top surface of the reservoir spool has a smaller diameter, the speed of that spool may be slightly higher so that the additional wire that has to be wound (coming from the difference in angle of the wire between the traveler pulley 4 and the storage spool 2 and the traveler pulley 4 and the reservoir spool 1 respectively) may be wound as fast as possible. A de-coupling of the rotational speeds may also take place if the wire is not wound to the storage spool.

Preferably the traveller pulley 4 is adapted to align (automatically or manually) the wire segment extending between itself and the storage spool 2 or reservoir spool 1 with the wire carrying surface 2a of that spool. Since the diameter of the wire bearing surface 2a of the reservoir spool 1 changes more compared to that of the storage spool 2 (which only changes because of wear), it is especially preferred if the traveller pulley 4 is adjustable when serving the reservoir spool 1 and preferably lockable when serving the storage spool 2 so that it's position is fixed when serving the storage spool 2. Good alignment and locking in that position ensures a more steady behaviour of the wire, leading to less wear, better wafer quality and less wire breakage.

If the roll and the drum are mechanically connected to each other, it is also possible to have a first rotational speed as long as the wire 3 is on the storage spool 2 and just when it no longer is on the storage spool 2 the rotational speed (of both, reservoir and storage spool) is increased (assuming that the reservoir spool has a smaller diameter).

The goal is to control the speed of the wire in the wire web because this results in the best wafer quality. The speed of the wire outside the wire web may temporarily deviate from this speed due to the transition between a reservoir spool and a storage spool or to control the tension in the wire.

FIGS. 12a to 12m show an embodiment of the inventive method of cutting a piece of material.

Initialization (FIGS. 12a-12d)

Figure 12A:
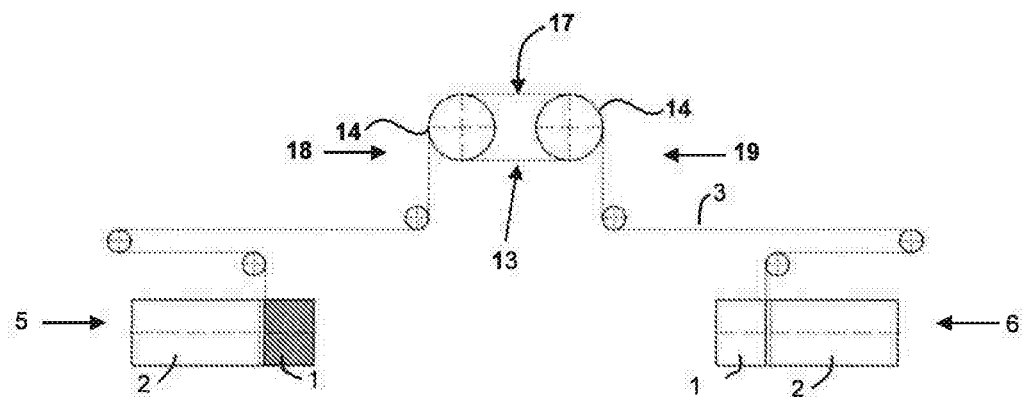

In FIG. 12a the wire web 17 is set and the distal end of the cutting wire is connected to the reservoir spool 1 of the receiving unit 6 (i.e. at the used wire side 19 of the wire web 17). Used wire side 19 is that side to which the wire leaves the cutting area 13 in the direction towards the receiving unit 6. New wire side 18 is that side to which the wire leaves the cutting area 13 in the direction towards the supplying unit 5. "New" and "used" refers to the fact, that the reservoir spool of the supplying unit 5 carries new (unused) wire and the reservoir spool of the receiving unit 6 carries old (already used) wire. FIG. 12a shows a reservoir spool and a storage spool with basically identical diameter.

Figure 12B:
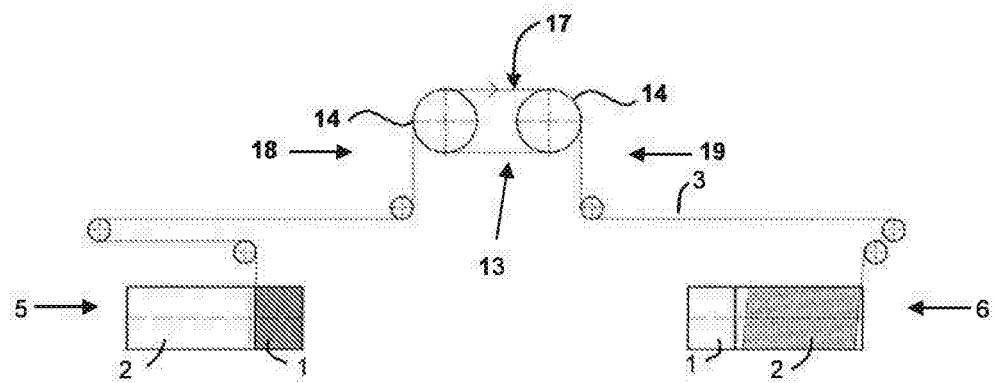

In FIG. 12b the cutting wire 3 moves in a first direction being transferred from the reservoir spool 1 of the supplying unit 5 via the new wire side 18 to the wire web 17 and being transferred via the used wire side 19 to the storage spool 2 of the receiving unit 6, such that its wire carrying surface holds preferably along its whole length a wire portion in non-overlapping windings.

Figure 12C:
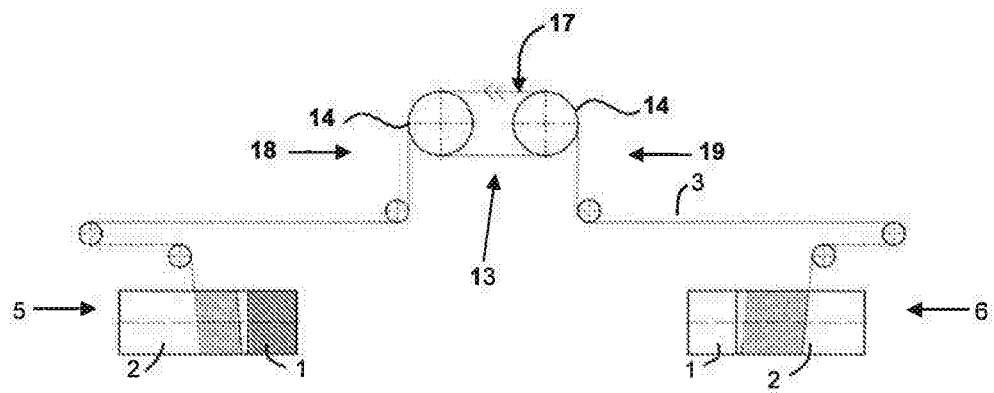

In FIG. 12c the storage spool 2 of the supplying unit 5 is wound up with cutting wire 3 coming from the wire web 17 via the new wire side 18 while the cutting wire 3 is unwound from the storage spool 2 of the receiving unit 6. The cutting wire moves in the second direction. If desired the wire web 17 can already cut material.

Figure 12D:
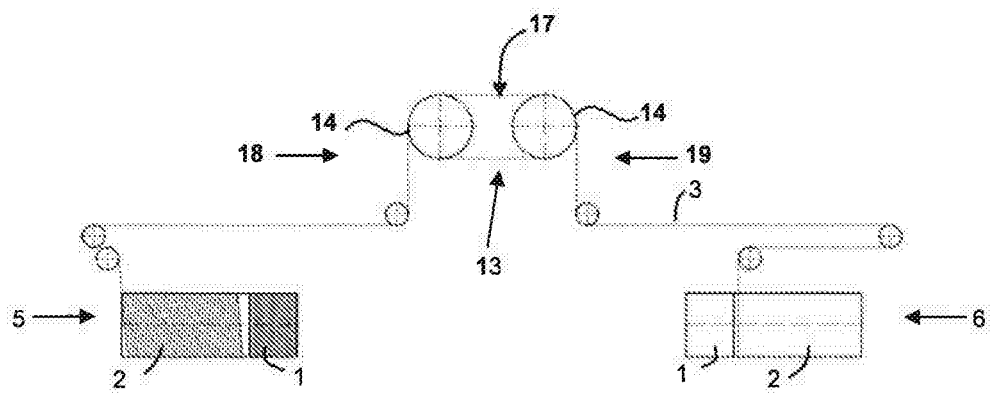

In FIG. 12d the storage spool 2 of the supplying unit 5 is completely filled. Wire 3 does not move. The Initialization is finished.

Figure 12E:
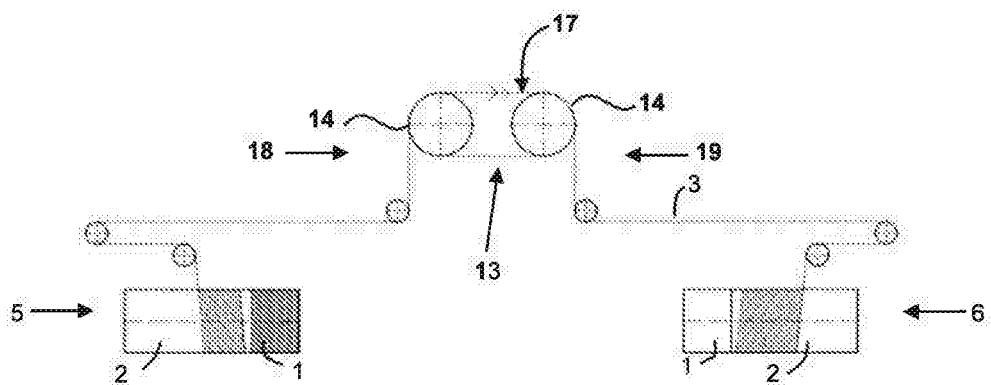
Figure 12F:
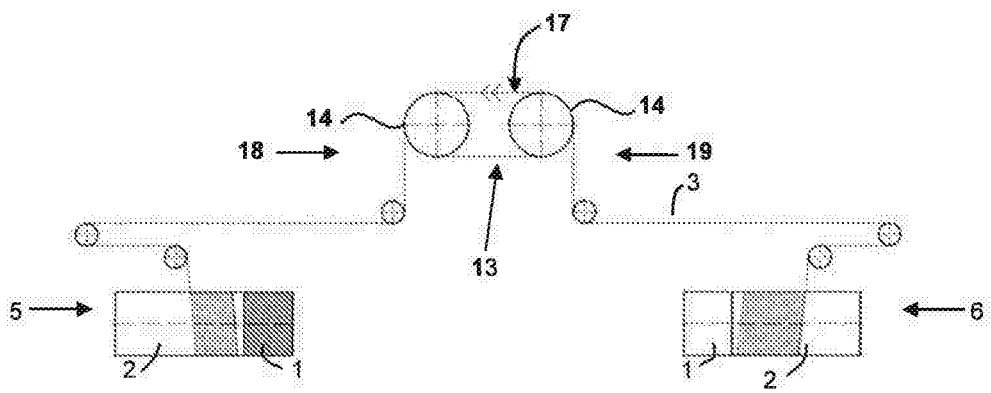

Cutting (FIGS. 12e and 12f)

In FIG. 12e cutting is in progress. The cutting wire 3 moves in the first direction and the wire 3 is wound on the storage spool 2 of the receiving unit 6.

In FIG. 12f cutting is in progress. The cutting wire 3 moves in the second direction and the wire 3 is wound on the storage spool 2 of the supplying unit 5.

Outward Transfer of Used (Old, Worn) Wire, Loading of New (Unused, Fresh) Wire (FIGS. 12g-12m)

Figure 12G:
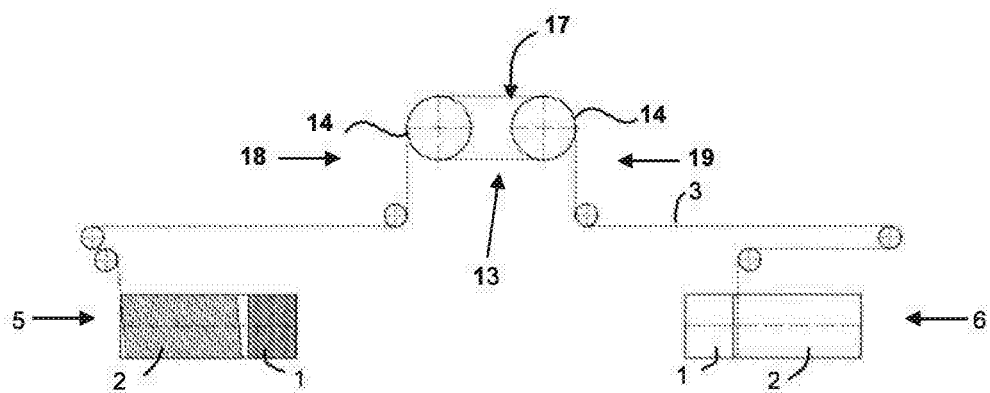

In FIG. 12g the storage spool 2 of the supplying unit 5 is completely filled. The first cutting cycle is finished. Wire 3 does not move. The wire saw 8 is now ready for a subsequent sawing cycle. The steps of FIGS. 12e and 12f may be repeated as often as appropriate. Alternatively the wire saw 8 is ready for outward transfer of used wire (to the reservoir spool of the receiving unit) and loading of new wire (from the reservoir spool of the supplying unit).

Figure 12H:
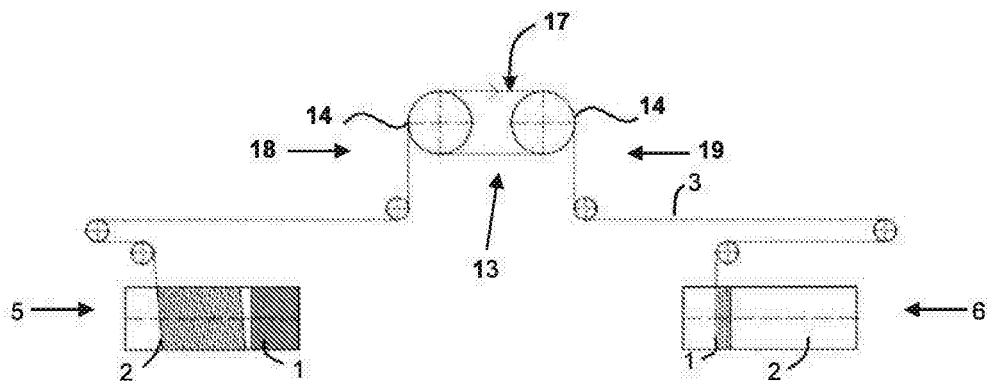

In FIG. 12h a portion of a 'used' wire (old or worn wire) coming from the wire web 17 via the old wire side 19 is wound on the reservoir spool 1 of the receiving unit 6. The amount of used wire to be wound to the reservoir spool 1 of the receiving unit 6 can be freely chosen depending on the specific process demand. If desired the wire web 17 can continue to cut material. Preferably the wire speed is slow.

Figure 12I:
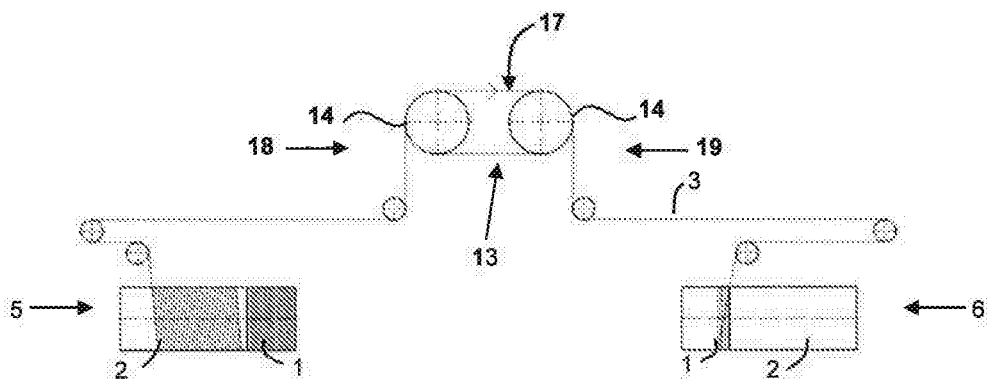

In FIG. 12i the winding process on the reservoir spool is finished and the wire 3 passes the transition area between the reservoir spool 1 and storage spool 2 while moving. If desired the wire web 17 can cut material. Preferably, the wire speed is slow.

Figure 12J:
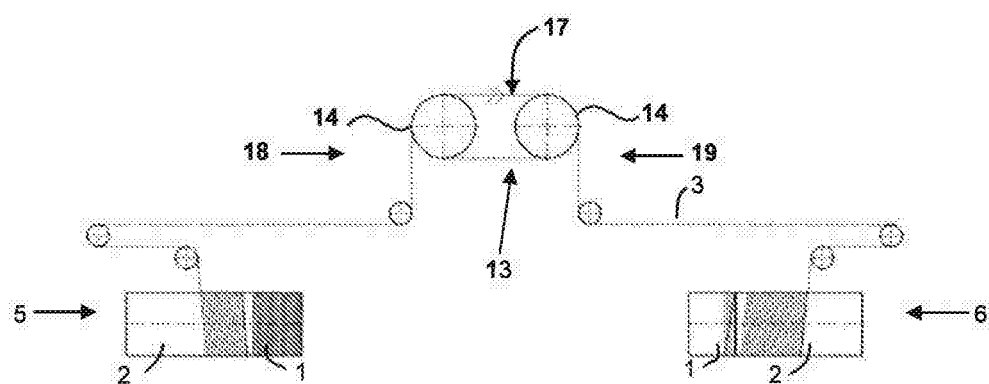

In FIG. 12j the cutting wire 3 moves in the first direction and the wire 3 is wound on the storage spool 2 of the receiving unit 6. The latter is e.g. filled to 95%.

Figure 12K:
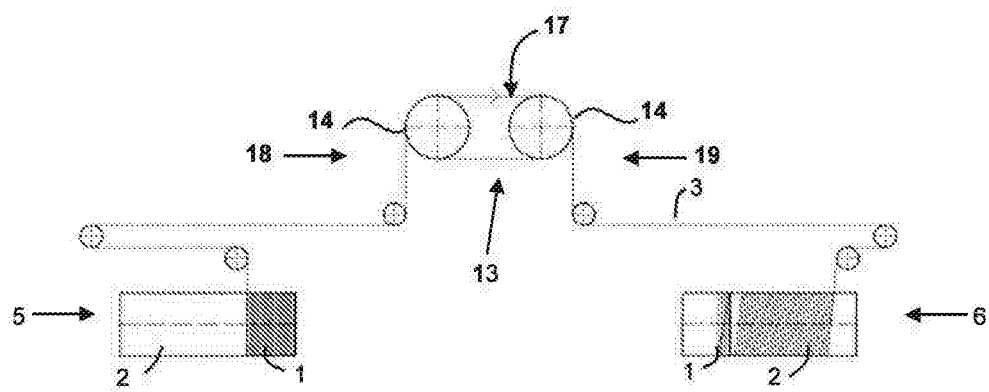
Figure 12L:
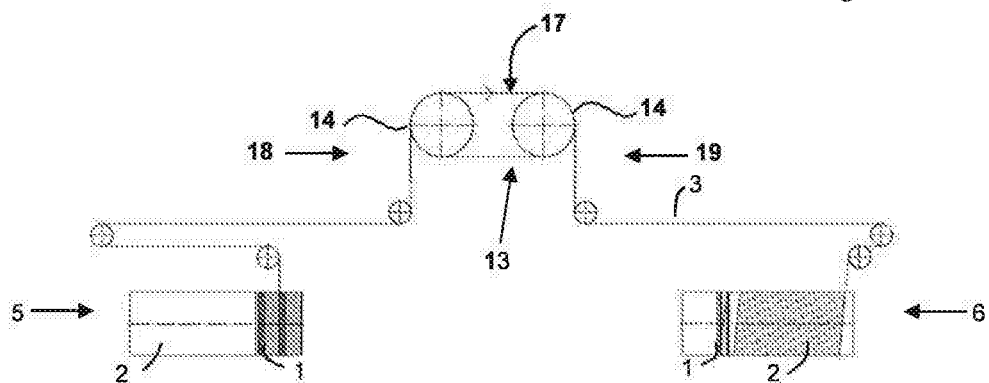

In FIG. 12k the wire 3 is decelerated. The wire 3 is completely removed from the storage spool 2 of the supplying unit 5. Now the addition of 'new' wire (unused or fresh wire) to the wire web 17 via the new wire side 18 coming from the reservoir spool 2 of the supplying unit 5 starts as is shown in FIG. 12l.

Figure 12M:
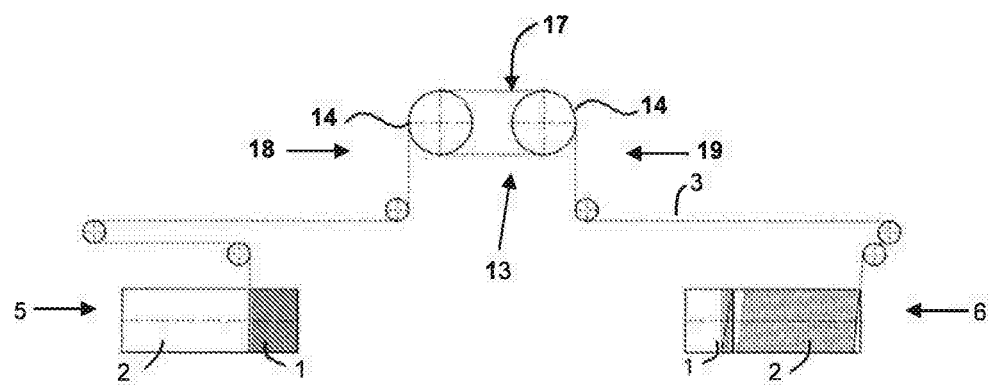

In FIG. 12m the storage spool 2 of the receiving unit 6 is completely filled again and the step of outward transfer of a used (old, worn) wire portion and loading of a new (unused, fresh) wire portion is completed. Now the cutting process continues with the steps shown in FIG. 12f-FIG. 12e-FIG. 12f and so on.

FIGS. 13a to 13l show an alternative embodiment of the inventive method of cutting a piece of material.

Figure 13A:
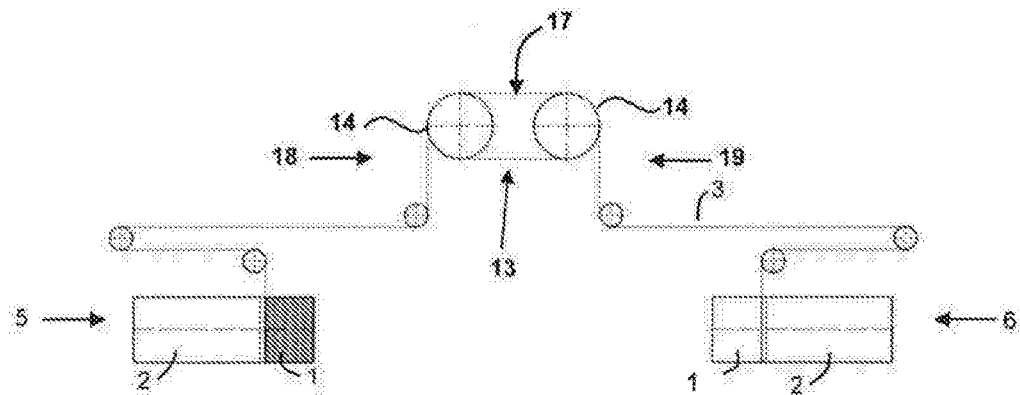
Figure 13B:
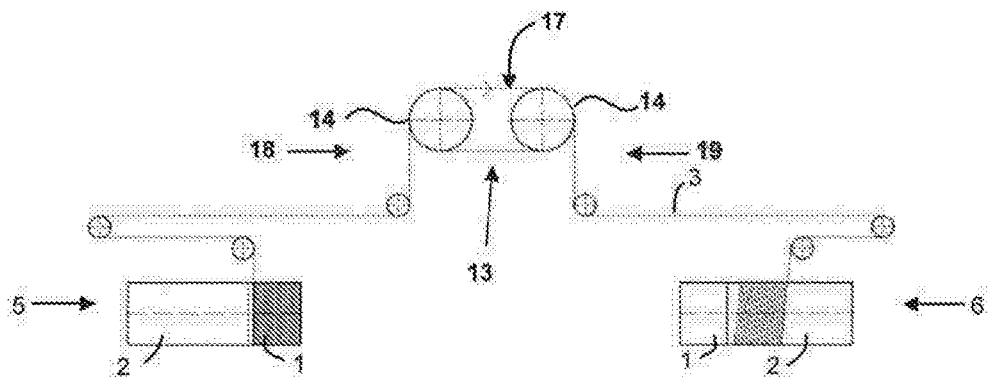
Figure 13C:
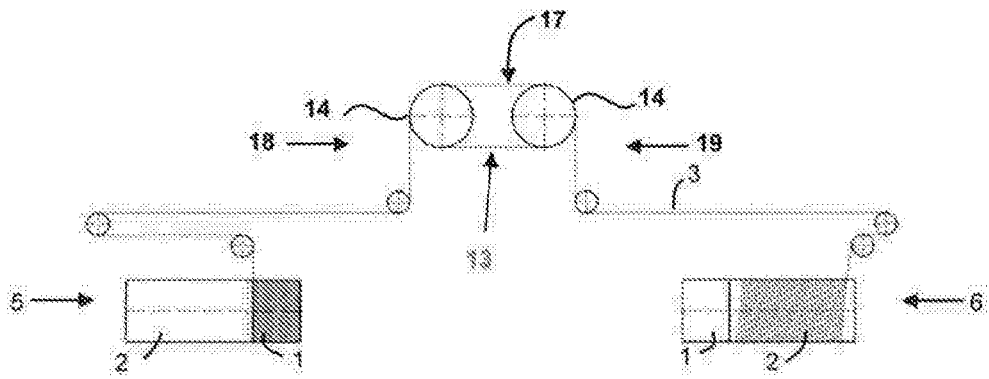

Initialization (FIGS. 13a-13c)

In FIG. 13a the wire web 17 is set and the distal end of the cutting wire is connected to the reservoir spool 1 of the receiving unit 6 at the used wire side 19 of the wire web 17.

In FIG. 13b the cutting wire 3 moves in a first direction being transferred from the reservoir spool 1 of the supplying unit 5 via the new wire side 18 to the wire web 17 and being transferred via the used wire side 19 to the storage spool 2 of the receiving unit 6, such that its wire carrying surface holds a wire portion in non-overlapping windings.

However, not the whole length of the storage spool 2 of the receiving unit 6 is filled with wire, in order to have place for additional wire at a later stage. This situation is shown in FIG. 13c.

Figure 13D:
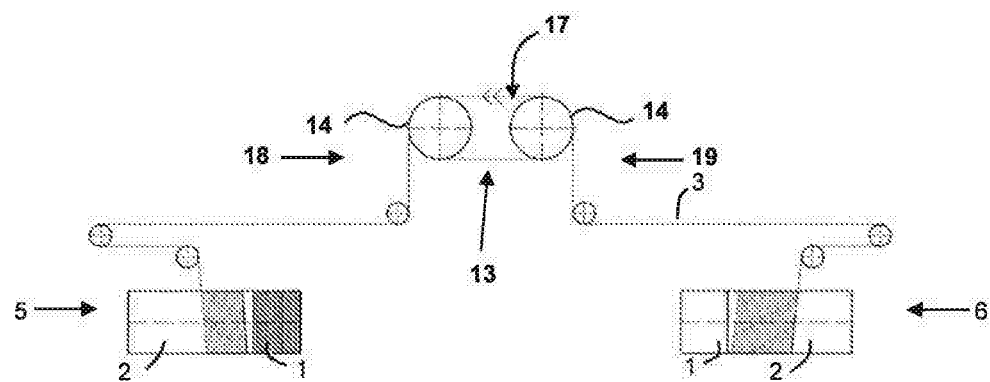
Figure 13E:
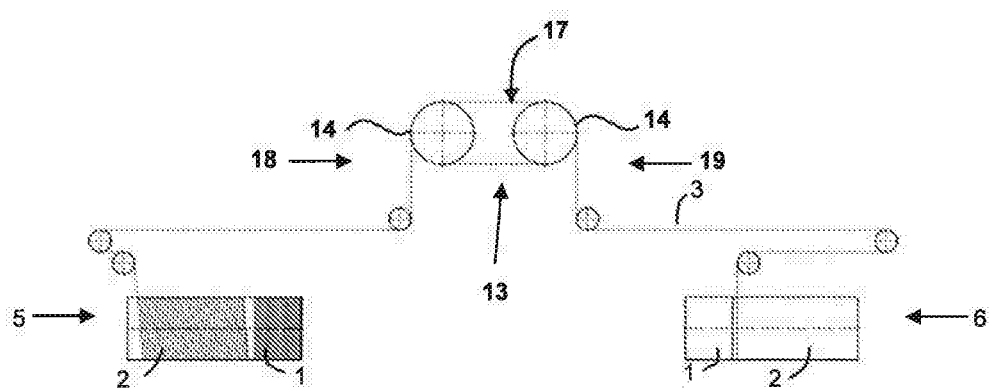
Figure 13F:
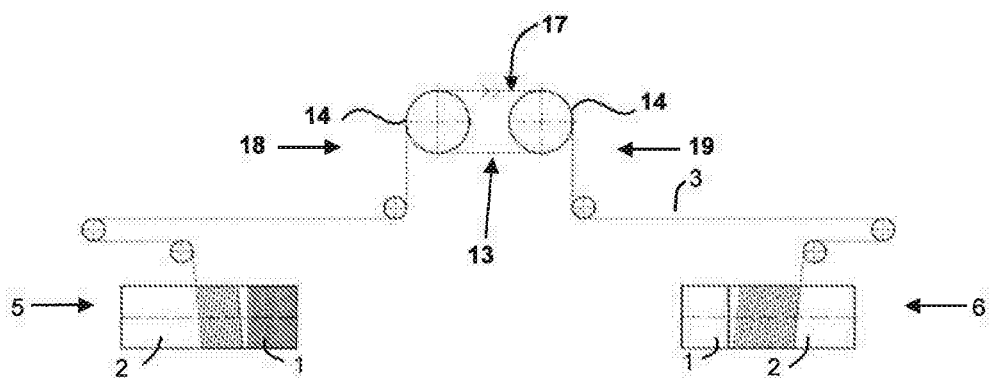

Cutting (FIGS. 13d-13f)

In FIG. 13d cutting is in progress. The cutting wire 3 moves in the second direction and the wire 3 is wound on the storage spool 2 of the supplying unit 5.

Not the whole length of the storage spool 2 of the supplying unit 5 is filled with wire, in order to have place for additional wire at a later stage. This situation is shown in FIG. 13e.

In FIG. 13f cutting is in progress. The cutting wire 3 moves in the first direction and the wire 3 is wound on the storage spool 2 of the receiving unit 6 until the situation of FIG. 13c is reached. The steps of FIGS. 13d to 13f may be repeated as often as appropriate.

Loading of New (Unused, Fresh) Wire, Outward Transfer of Used (Old, Worn) Wire (FIGS. 13g-13l)

Figure 13G:
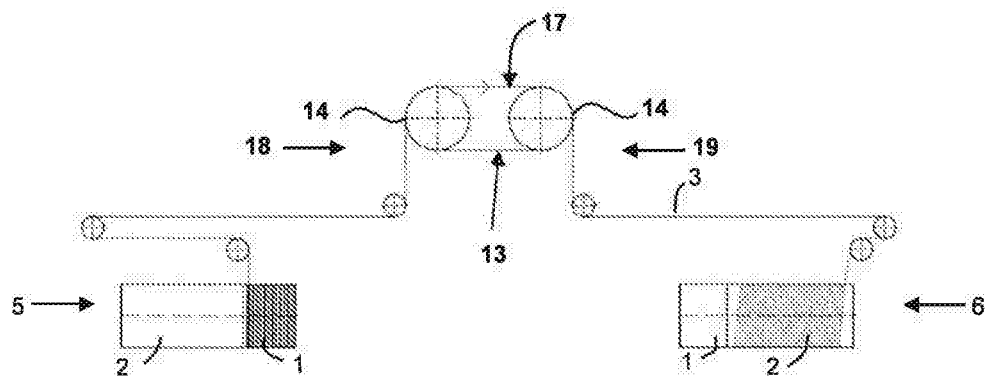

In FIG. 13g contrary to the step shown in FIG. 13c the wire 3 continues to move in the first direction. A desired portion of new wire of the reservoir spool 1 of the supplying unit 5 is transferred to the wire web 17 via the new wire side 18 and the same amount of the cutting wire 3 coming from the wire web 17 via the used wire side 19 is transferred to the storage spool 2 of the receiving unit 6.

Figure 13H:
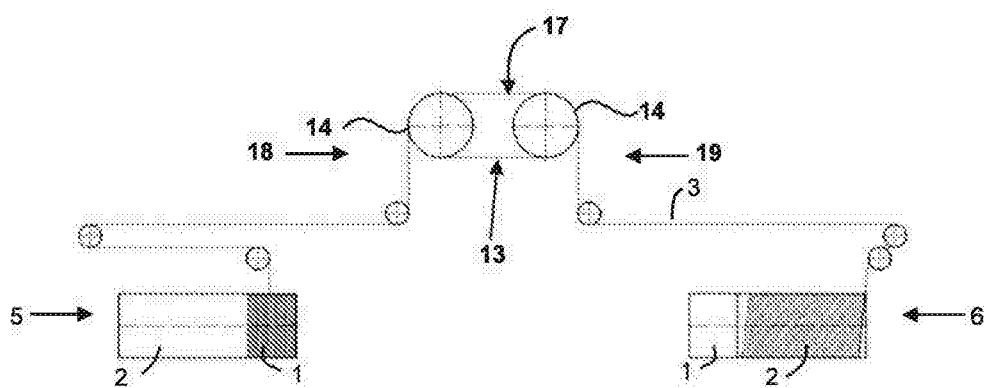

In FIG. 13h the addition of new wire to the wire web 17 is completed.

Figure 13I:
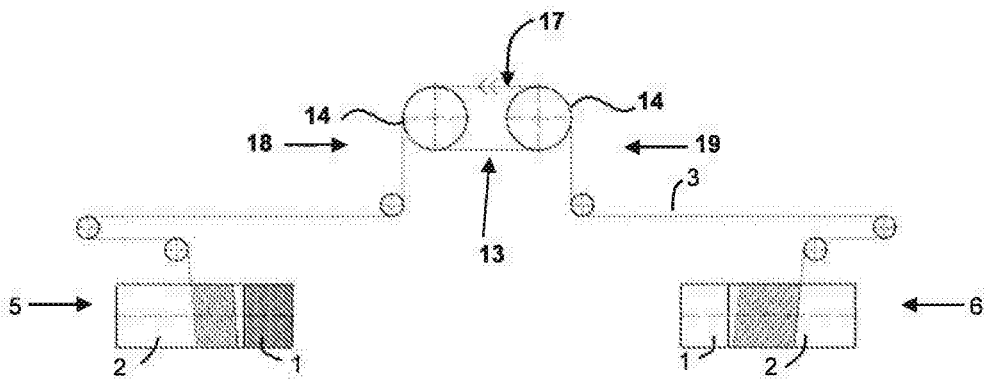

In FIG. 13i cutting wire 3 is transferred from the storage spool 2 of the receiving unit 6 to the wire web 17 via the used wire side 19 and cutting wire is transferred from the wire web 17 via the new wire side 18 to the storage spool 2 of the supplying unit 5. If desired the wire web 17 can continue to cut material.

Figure 13J:
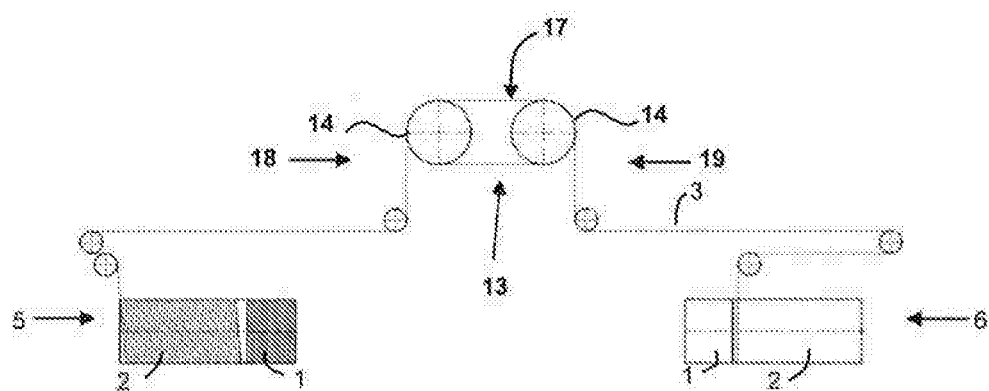

In FIG. 13j the storage spool 2 of the supplying unit 5 is filled. The methods shown in FIGS. 12 and 13 respectively can be used interchangeably. It can be switched between the methods shown in FIG. 12 and FIG. 13 when the states are equal as shown in FIGS. 12g and 13j.

Figure 13K:
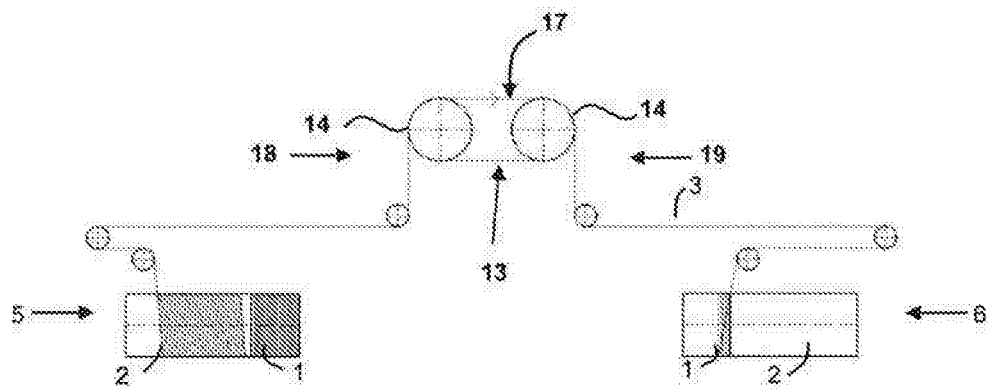

In FIG. 13k a 'used' portion of the wire (old or worn wire) coming from the wire web 17 via the used wire side 19 is wound on the reservoir spool 1 of the receiving unit 6. The amount of old wire can be freely chosen depending on the specific process demand. After the desired amount of old wire is wound on the reservoir spool 1 of the wire receiving unit 6 the wire 3 passes the transition area between the reservoir spool 1 and storage spool 2 while moving. If desired the wire web 17 can continue to cut material during the whole step shown in FIG. 13k. Preferably the wire speed is slow.

Figure 13L:
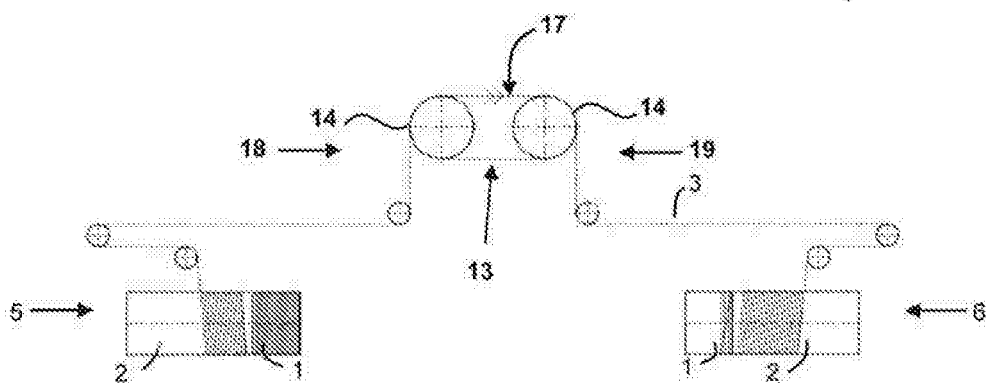

In FIG. 13l the step of loading a new (unused, fresh) wire portion and outward transfer of a used (old, worn) wire portion is completed. Now the cutting process continues with the steps shown in FIG. 13f-FIG. 13d-FIG. 13e-FIG. 13f and so on.

The direction of wire movement is indicated in these figures. During wire movement cutting action is usually performed.

FIGS. 14 to 21 show an alternative embodiment of the cutting method.

Figure 14:
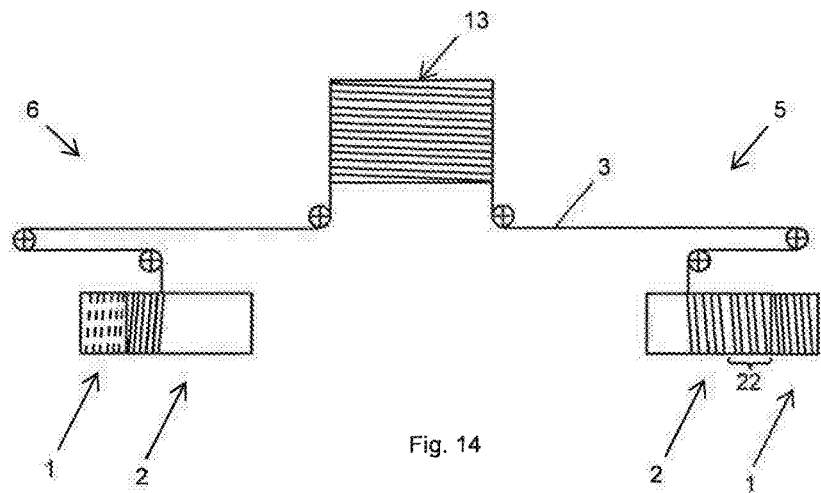

FIG. 14 shows a first cutting cycle, comprising a plurality of reversals of the moving direction of the cutting wire 3. During the first cutting cycle the moving direction of the cutting wire 3 is reversed before the cutting wire 3 is completely unwound from the storage spool 2 of the supplying unit 5, such that during the first cutting cycle a section 22, preferably a unused section, of cutting wire 3 is stored on/remains on the storage spool 2 of the supplying unit 5 without reaching the cutting area 13.

In a transitional step following the first cutting cycle also cutting wire 3 from the previously unused section 22 is brought into the cutting area 13, i.e. becomes part of the wire web or is at least moved towards the cutting area 13. The unused section 22 of cutting wire becomes successively smaller (FIG. 15).

Figure 15:
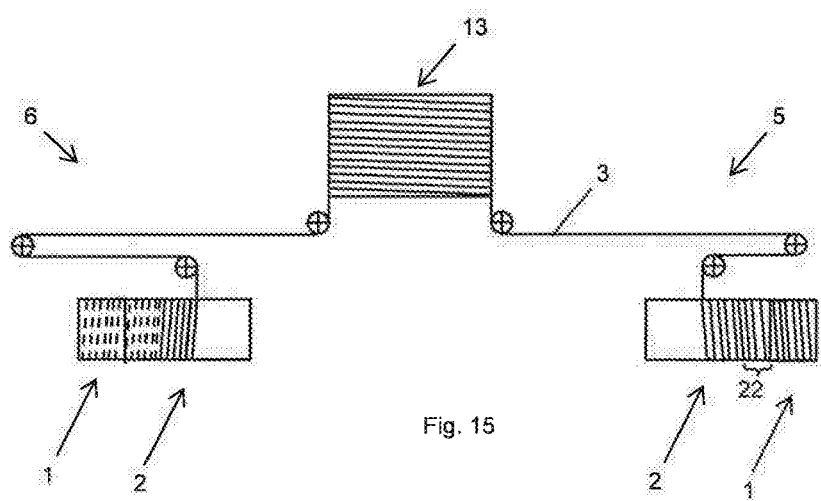
Figure 16:
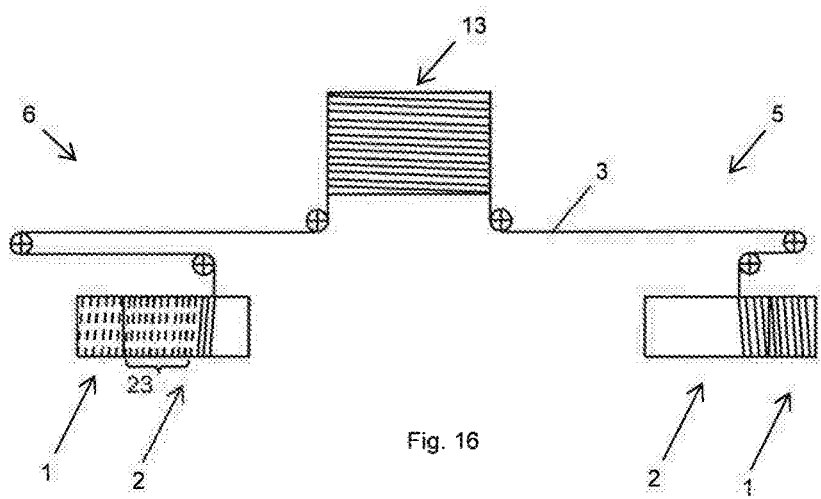

FIG. 16 shows a second cutting cycle, comprising a plurality of reversals of the moving direction of the cutting wire 3. During the second cutting cycle the moving direction of the cutting wire 3 is reversed such that a section of cutting wire 3 which during the first cutting cycle has been stored on the storage spool 2 of the supplying unit 5 without having reached the cutting area 13 is brought into the cutting area 13, and that during the second cutting cycle the moving direction of the cutting wire 3 is reversed before the cutting wire 3 is completely unwound from the storage spool 2 of the receiving unit 6, such that during the second cutting cycle a used section 23 of cutting wire 3 is stored on the storage spool 2 of the receiving unit 6 without reaching the cutting area 13 (in consecutive reversals of the moving direction of cutting wire 3 aimed to cut material). The steps of FIG. 15 are repeated until almost all wire on the storage spool 2 of supply unit 5 is used.

Also visible in FIGS. 15 through 16 is that over time more and more used cutting wire (represented by dashed line) is temporarily stored on the storage spool 2 of the receiving unit 6.

Figure 17:
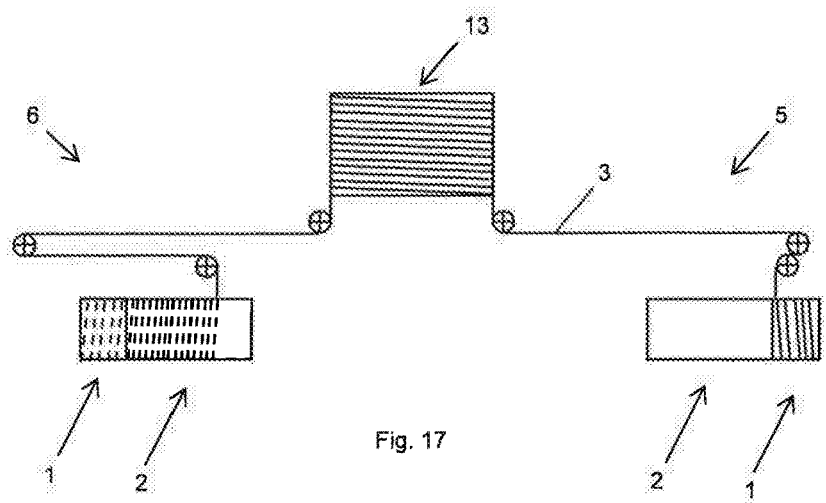
Figure 18:
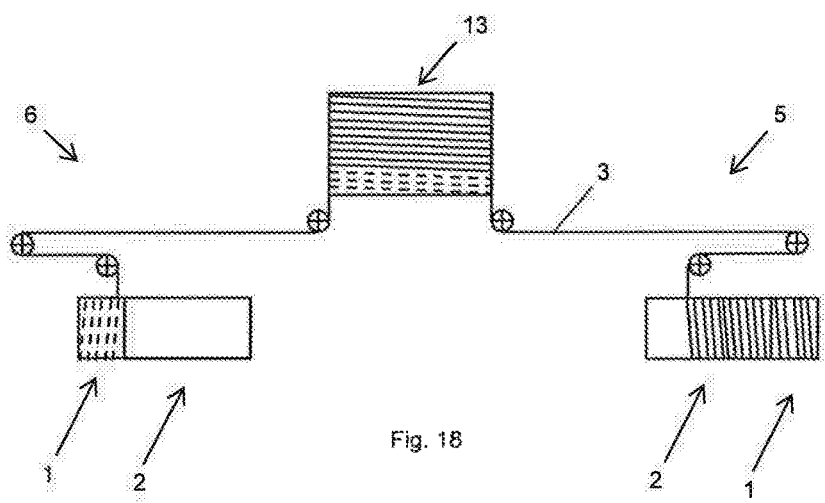

Once all wire on the storage spools 2 has been used up, all wire is removed from the storage spool 2 of the supply unit 5. This is shown in FIG. 17.

Figure 19:
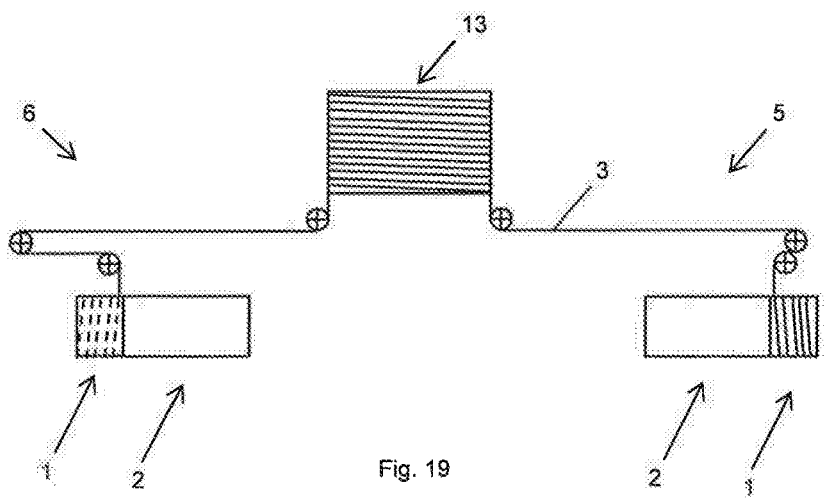

In a preferred embodiment the cutting method comprises a step of transferring a used section of cutting wire 3 from the storage spool 2 of the receiving unit 6 to the reservoir spool 1 of the receiving unit 6. This is done—according to FIG. 18—by completely unwinding the used section of cutting wire 3 from the storage spool 2 of the receiving unit 6 (i.e. pulling it into the cutting area 13, i.e. wire web) followed by reversal of the moving direction of the cutting wire 3 and winding the used section of cutting wire 3 on the reservoir spool 1 of the receiving unit 6 (FIG. 19). It is mentioned that the illustrations of FIGS. 14 to 23 are just schematically. Particularly, the cutting wire may be wound on the reservoir spool of course in multiple overlapping windings/layers.

The step of transferring a used section of cutting wire 3 from the storage spool 2 of the receiving unit 6 to the reservoir spool 1 of the receiving unit 6 is done between two successive cuts, i.e. during this step no piece of material is cut or is in contact with the cutting wire.

Now, new wire is unwound from the reservoir spool 1 of the supplying unit 5 towards the cutting area 13 (FIG. 20). On the other side of the cutting area 13 cutting wire 3 is spooled on the storage spool 2 of the receiving unit 6. In FIG. 21 a new cutting cycle is started. The steps as described according to the FIGS. 14 to 20 may now be repeated. It has to mentioned that the cutting wire in the Figures is illustrated schematically and that the wires (particularly the wires illustrated with dashed lines) continuously extend throughout the surface of the spools.

The great advantage of this embodiment is that the interchange from used and unused cutting wire 3 can be accomplished during a cut (i.e. during the wire web is in contact with a piece of material) without taking wire from the reservoir spool 1. To enable this wire length which is spooled from—or onto—the storage spool between two successive reversals is smaller than the length of cutting wire initially stored on the storage spool 2. The interchange from used to unused cutting wire 3 can be done continuously by means of a difference between the pilgrim length during movement in a first direction and the pilgrim length during the subsequent movement in the opposite direction.

The basic idea of the following method (FIGS. 22 and 23) is principally independent of the embodiments described above. However, it is of course possible to perform this method with the wire management system as described above.

FIGS. 22 and 23 show the extent of wear of cutting wire sections. The abscissa corresponds to the length of the cutting wire 3 and the ordinate to the wear or extent of abrasion. The mark MAX denotes to the maximal possible extent of abrasion of cutting wire which is acceptable for cutting. Going beyond this point would lead to unacceptable risk of wire breakage and cuts of poor quality. The abrasion profile of a wire section used within a cutting cycle comprising a plurality of reversals of the moving direction of the cutting wire 3 has an approximately trapezoidal shape. The plateau of the abrasion function refers to a range 27 of wire points having between two successive reversals of a cutting cycle essentially the same effective interaction length with the piece of material: complete usage section. Thus their wear is the same. At the beginning of the cutting wire section wear increases until the plateau is reached. At the end of the cutting wire section wear decreases again. This slope has its origin in the fact, that the effective interaction length with the piece of material becomes smaller towards the end of a wire section: wire points in this section do not travel through the complete wire web before the moving direction of the wire is reversed. Consequently these points do not "see" as much material to be cut as points in the complete usage section. There is a wire point which, during a cutting cycle, comes into contact with one point only of the material to be cut. In order to account for these wearing differences at the end of the respective wire section the following method is proposed:

The method of cutting a piece of material, preferably semiconductor material, preferably in form of an ingot, brick or core, is performed with a wire saw 8 comprising a wire management system 7 having a cutting wire 3 which is guided through a cutting area 13. The wire management system 7 comprises a wire supplying unit 5 for supplying cutting wire 3 to the cutting area 13 of the wire saw 8 and a wire receiving unit 6 for receiving cutting wire 3 from the cutting area 13 of the wire saw 8. It is not necessary, that the wire management system has the same build-up as described above.

During a first cutting cycle, comprising a plurality of reversals of the moving direction of the cutting wire 3, a first section 24 of cutting wire 3 is used in the cutting area 13 for cutting the piece of material, the first section 24 being defined by all wire points that between reversals of the first cutting cycle come into contact at least once with the piece of material to be cut. Over time wear becomes successively larger. (dashed lines in FIG. 22 show intermediate abrasion states of the wire.)

During a second cutting cycle, comprising a plurality of reversals of the moving direction of the cutting wire 3, a second section 25 of cutting wire 3 is used in the cutting area 13 for cutting the piece of material, the second section 25 being different to the first cutting section 24 and being defined by all points which between the reversals of the second cutting cycle come into contact with the piece of material to be cut.

The first section 24 of cutting wire 3 and the second section 25 of cutting wire 3 overlap in their end regions, forming overlapping range 26. In the end regions—as can be seen from FIG. 23—the extent of wear resulting from the first cutting cycle sums up with the extent of wear resulting from the second cutting cycle and surprisingly a constant wear along the whole wire length is obtained due to addition of virtual triangles in the end regions of the wire sections 24, 25. In such a manner the cutting wire 3 may be exploited to an optimal extent by constantly using overlapping cutting sections, preferably up to 100%, leaving only at the very beginning and at the very end of the entire cutting wire 3 regions with sub-optimal wear.

Preferably, the overlapping range 26 is located outside, preferably immediately adjacent to a range 27, 28 of wire points having between two successive reversals of a cutting cycle essentially the same effective interaction length with the piece of material (plateau of FIG. 22). This embodiment is shown in FIG. 23, where the overlapping range 26 comprises two ramp-shaped ranges of the abrasion profile.

If the maximal wear off (MAX) is not reached after one cut, the wire segment may be used for a second consecutive cut without addition of a new wire portion from the reservoir spool. If the maximal wear off (MAX) is not reached after a second cut, the wire segment may be used for a third consecutive cut without addition of a new wire portion from the reservoir spool—and so forth. If the wire quality does not suffice for one complete cut, multiple wire sections may be used for one cut. Alternatively the cutting recipe may be chosen such (especially pilgrim length and cutting pressure) so that after a number of complete cuts, the wire is almost completely worn off in the complete usage section.

The invention is not restricted to these embodiments. Other variants will be readily apparent for the person skilled in the art, and are considered to lie within the scope of the invention as formulated in the appended claims. Individual features described in above specification, particularly with respect to the figures may be combined with each other to form other embodiments and/or applied mutatis mutandis to what is described in the claims and to the rest of the description.

LIST OF REFERENCE LABELS 1 reservoir spool
1a wire carrying surface of the reservoir spool 1
1b rotational axis of the reservoir spool 1
2 storage spool
2a wire carrying surface of the storage spool 2
2b rotational axis of the storage spool 2
3 cutting wire
4 traveler pulley
5 wire supplying unit
6 wire receiving unit
7 wire management system
8 wire saw
9 wire guide
10 rotational drive
11 rotational drive
12 transition area
13 cutting area
14 wire guide rollers
15 drives
16 control device 17 wire web
18 new wire side
19 used wire side
20 dancer pulley
21 pulley arm
22 unused section of cutting wire 3
23 used section of cutting wire 3
24 first section of cutting wire 3
25 second section of cutting wire 3
26 overlapping range
27 range of (completely) worn wire points, complete usage section
28 range of (completely) worn wire points, complete usage section

What is claimed is:

1. A wire saw cutting-wire management system comprising:
    at least one rotatable reservoir spool configured to carry cutting wire in overlapping windings, said at least one rotatable reservoir spool having a reservoir spool axis;
    at least one rotatable storage spool configured to temporarily receive cutting wire windings, said at least one rotatable storage spool having a storage spool axis that essentially coincides with said reservoir spool axis;
    a wire guide movable along said storage spool axis, said wire guide configured to guide cutting wire towards said at least one rotatable storage spool in non-overlapping windings;
    a cutting wire wrapped around said at least one rotatable reservoir spool and said at least one rotatable storage spool;
    a first wire carrying surface at said at least one reservoir spool, said first wire carrying surface having a first diameter; and
    a second wire carrying surface at said at least one rotatable storage spool, said second wire carrying surface having a second diameter that is larger than said first diameter.

2. The wire saw cutting-wire management system as claimed in claim 1, wherein:
    the first wire carrying surface has a first length and the second wire carrying surface has a second length that is larger than said first length.

3. The wire saw cutting-wire management system as claimed in claim 1 further comprising:
    a synchronizer operatively connected to synchronize rotational speeds of said at least one rotatable reservoir spool and said at least one rotatable storage spool.

4. The wire saw cutting-wire management system as claimed in claim 3 further comprising:
    a common rotational drive operatively connected to drive said at least one rotatable reservoir spool and said at least one rotatable storage spool; and
    said synchronizer including a fixed connection between said at least one rotatable storage spool and said at least one rotatable reservoir spool.

5. The wire saw cutting-wire management system as claimed in claim 3 further comprising:
    a first rotational drive operatively connected to drive said at least one rotatable reservoir spool;
    a second rotational drive operatively connected to drive said at least one rotatable storage spool; and
    said synchronizer includes a controller operatively connected to synchronize said first and second rotational drives.

6. The wire saw cutting-wire management system as claimed in claim 1 further comprising:
    a traveler pulley included in said wire guide, said traveler pulley being movable along said storage spool axis over a length of said at least one rotatable storage spool, said traveler pulley being movable along said reservoir spool axis over a length of said at least one rotatable reservoir spool.

7. The wire saw cutting-wire management system as claimed in claim 1 wherein:
    said wire guide includes wire-guiding grooves, said wire guiding grooves being on a wire-carrying surface of said at least one rotatable storage spool.

8. The wire saw cutting-wire management system as claimed in claim 1 further comprising:
    at least two wire web rollers configured to form a wire web of cutting wire.

9. The wire saw cutting-wire management system as claimed in claim 1, wherein:
    said at least one rotatable reservoir spool is configured to carry cutting wire in a first set of windings;
    said at least one rotatable storage spool is configured to temporarily receive cutting wire in a second set of windings; and
    said wire guide is configured so that said second set of windings have a lower density than said first set of windings.

10. The wire saw cutting-wire management system as claimed in claim 9, further comprising:
    a wire supplying unit that includes said at least one rotatable reservoir spool and said at least one rotatable storage spool, said wire supplying unit being configured to supply cutting wire to a saw cutting area.

11. The wire saw cutting-wire management system as claimed in claim 9, further comprising:
    a wire receiving unit that includes said at least one rotatable reservoir spool and said at least one rotatable storage spool, said wire receiving unit being configured to receive cutting wire from a saw cutting area.

12. The wire saw cutting-wire management system as claimed in claim 9 wherein:
    said at least one rotatable reservoir spool and said at least one rotatable storage spool are mounted next to each other.

13. The wire saw cutting-wire management system as claimed in claim 9 further comprising:
    a traveler pulley included in said wire guide, said traveler pulley being movable along said storage spool axis over a length of said at least one rotatable storage spool, said traveler pulley being movable along said reservoir spool axis over a length of said at least one rotatable reservoir spool.

14. The wire saw cutting-wire management system as claimed in claim 9 wherein:
    said wire guide includes wire-guiding grooves, said wire guiding grooves being on a wire-carrying surface of said at least one rotatable storage spool.

15. The wire saw cutting-wire management system as claimed in claim 9 further comprising:
    at least two wire web rollers configured to form a wire web of cutting wire.

16. The wire saw cutting-wire management system as claimed in claim 9, wherein said wire guide is also movable along said reservoir spool axis, said wire guide configured to guide cutting wire towards said at least one rotatable reservoir spool.

17. The wire saw cutting-wire management system as claimed in claim 1, wherein said wire guide is also movable along said reservoir spool axis, said wire guide configured to guide cutting wire towards said at least one rotatable reservoir spool.

18. The wire saw cutting-wire management system as claimed in claim 1, further comprising:
 a wire supplying unit that includes said at least one rotatable reservoir spool and said at least one rotatable storage spool, said wire supplying unit being configured to supply the cutting wire to a saw cutting area.

19. The wire saw cutting-wire management system as claimed in claim 1 further comprising:
 a wire receiving unit that includes said at least one rotatable reservoir spool and said at least one rotatable storage spool, said wire receiving unit being configured to receive the cutting wire from a saw cutting area.

20. The wire saw cutting-wire management system as claimed in claim 1 wherein:
 said at least one rotatable reservoir spool and said at least one rotatable storage spool are mounted next to each other.

21. A wire saw cutting-wire management system comprising:
 at least one rotatable reservoir spool configured to carry cutting wire in a first set of windings, said at least one rotatable reservoir spool having a reservoir spool axis;
 at least one rotatable storage spool configured to temporarily receive cutting wire in a second set of windings, said at least one rotatable storage spool having a storage spool axis that essentially coincides with said reservoir spool axis;
 a cutting wire wrapped around said at least one rotatable reservoir spool and said at least one rotatable storage spool;
 a wire guide movable along said storage spool axis, said wire guide configured to guide cutting wire towards said at least one rotatable storage spool so that said second set of windings have a lower density than said first set of windings;
 a first wire carrying surface at said at least one rotatable reservoir spool, said first wire carrying surface having a first diameter; and
 a second wire carrying surface at said at least one rotatable storage spool, said second wire carrying surface having a second diameter that is larger than said first diameter.

22. The wire saw cutting-wire management system as claimed in claim 21, wherein said wire guide is also movable along said reservoir spool axis, said wire guide configured to guide cutting wire towards said at least one rotatable reservoir spool.

\* \* \* \* \*